(12) United States Patent
Wang et al.

(10) Patent No.: US 10,445,890 B2
(45) Date of Patent: Oct. 15, 2019

(54) DUAL CAMERA SYSTEM AND IMAGE PROCESSING METHOD FOR ELIMINATING AN ALIGNMENT VECTOR OF AN OCCLUSION AREA IN AN IMAGE ALIGNMENT VECTOR FIELD

(71) Applicant: HUAWEI TECHNOLOGIES CO., LTD., Shenzhen (CN)

(72) Inventors: Kongqiao Wang, Shenzhen (CN); Jiangwei Li, Beijing (CN); Congchao Zhu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/779,859

(22) PCT Filed: Nov. 30, 2015

(86) PCT No.: PCT/CN2015/095916
§ 371 (c)(1),
(2) Date: May 30, 2018

(87) PCT Pub. No.: WO2017/091927
PCT Pub. Date: Jun. 8, 2017

(65) Prior Publication Data
US 2018/0357775 A1    Dec. 13, 2018

(51) Int. Cl.
*G06T 7/33*    (2017.01)
*H04N 5/225*    (2006.01)
(Continued)

(52) U.S. Cl.
CPC .............. *G06T 7/33* (2017.01); *G06K 9/6202* (2013.01); *G06K 9/6211* (2013.01);
(Continued)

(58) Field of Classification Search
CPC ... G06T 7/33; G06T 7/11; G06T 7/174; G06T 7/194; G06T 7/55; G06T 2207/10012;
(Continued)

(56) References Cited

U.S. PATENT DOCUMENTS 8,619,082 B1 *   12/2013   Ciurea ................. H04N 13/232
                                                         345/427
2012/0249746 A1   10/2012   Cornog et al.
(Continued)

FOREIGN PATENT DOCUMENTS

CN      103927785     *   7/2014   ............. G06T 17/00
CN      103927785 A       7/2014
(Continued)

OTHER PUBLICATIONS

M Brown, DG Lowe, "Automatic Panoramic Image Stitching using Invariant Features", International journal of computer vision, 2007, total 16 pages.
(Continued)

*Primary Examiner* — Twyler L Haskins
*Assistant Examiner* — Akshay Trehan
(74) *Attorney, Agent, or Firm* — Kilpatrick Townsend & Stockton LLP

(57) ABSTRACT

Obtaining a first set including key point descriptors in a first image that is of a to-be-shot scene and that is formed by using a first camera in a dual camera system, and a second set including key point descriptors in a second image that is of the to-be-shot scene and that is formed by using a second; pairing a key point in the first set and a key point in the second set that match each other to form a key point pair; selecting the key point pair that meets a predetermined condition; generating an image alignment vector field according to the selected key point pair; and estimating an occlusion area according to the depth information of the first
(Continued)

image and the second image, and eliminating an alignment vector of the occlusion area in the image alignment vector field, to form a corrected image alignment vector field.

12 Claims, 8 Drawing Sheets

(51) Int. Cl.
    *H04N 5/232* (2006.01)
    *G06K 9/62* (2006.01)
    *H04N 5/247* (2006.01)
    *G06T 7/55* (2017.01)
    *H04N 5/265* (2006.01)
    *G06T 7/11* (2017.01)
    *G06T 7/194* (2017.01)
    *G06T 7/174* (2017.01)
    *H04N 5/235* (2006.01)
    *G06K 9/00* (2006.01)
    *G06K 9/46* (2006.01)

(52) U.S. Cl.
    CPC .............. G06K 9/6215 (2013.01); G06T 7/11 (2017.01); G06T 7/174 (2017.01); G06T 7/194 (2017.01); G06T 7/55 (2017.01); H04N 5/2258 (2013.01); H04N 5/23229 (2013.01); H04N 5/247 (2013.01); H04N 5/265 (2013.01); *G06K 9/00201* (2013.01); *G06K 9/4671* (2013.01); *G06T 2207/10012* (2013.01); *H04N 5/2355* (2013.01); *H04N 5/23232* (2013.01)

(58) Field of Classification Search
    CPC .............. G06K 9/00201; G06K 9/4671; G06K 9/6202; G06K 9/6211; G06K 9/6215; H04N 5/2258; H04N 5/23229; H04N 5/247; H04N 5/265; H04N 5/23232; H04N 5/2355
    See application file for complete search history.

(56) References Cited

U.S. PATENT DOCUMENTS

| | | | |
|---|---|---|---|
| 2012/0262607 A1* | 10/2012 | Shimura | H04N 5/2258 348/239 |
| 2015/0324988 A1 | 11/2015 | Swanson et al. | |
| 2017/0358059 A1* | 12/2017 | Zhang | G11B 27/031 |
| 2017/0366795 A1* | 12/2017 | Chou | G06T 7/593 |
| 2019/0020861 A1* | 1/2019 | Leonard | H04N 13/111 |

FOREIGN PATENT DOCUMENTS

| | | |
|---|---|---|
| CN | 103971378 A | 8/2014 |
| CN | 104463817 A | 3/2015 |
| CN | 104978750 A | 10/2015 |
| WO | 2015150634 A1 | 10/2015 |

OTHER PUBLICATIONS

Motion Estimation and Compensated Interpolation,Motion Compensated Video Deinterlacing and Framerate Conversion,Retrieved from Internet on Jun 27, 2018,total 12 pages.

Zhongding Jiang, Tien-Tsin Wong and Hujun Bao, "Practical Super-Resolution from Dynamic Video Sequences", in Proceedings of IEEE Computer Vision and Pattern Recognition (CVPR 2003), Madison, Wisconsin, USA, Jun. 2003, total 6 pages.

* cited by examiner

TO

DUAL CAMERA SYSTEM AND IMAGE PROCESSING METHOD FOR ELIMINATING AN ALIGNMENT VECTOR OF AN OCCLUSION AREA IN AN IMAGE ALIGNMENT VECTOR FIELD

CROSS-REFERENCE TO RELATED APPLICATIONS

This application is a national stage of International Application No. PCT/CN2015/095916, filed on Nov. 30, 2015, which is hereby incorporated by reference in its entirety.

TECHNICAL FIELD

The present invention relates to the image processing field, and more specifically, to an image processing method and a dual camera system.

BACKGROUND

As a user requirement for an imaging function of a mobile device increases, numerous mobile phone vendors pay more attention to a dual camera imaging technology that can improve a focusing function of a mobile phone camera and imaging quality. A dual camera, by using different dual camera hardware configurations, not only can photograph a relatively long-distance object in a non-digital zoom manner to improve low light imaging performance and motion blur performance, but further has a capability of analyzing and determining depth of field of a scene to implement background blurring and an auto-focus function.

Alignment and registration between dual camera images are essential technical steps for high dynamic range (High-Dynamic Range, HDR for short) image and super resolution that are used as an important function of dual camera imaging. Because differences between angles of view of the dual camera cause differences between imaging content of two images, some areas are not visible in the two images. These areas may be defined as occlusion areas, and usually appear at a junction of foreground and background. In a process of aligning the two images, because an area that matches an occlusion area of a single image is not found in the other image, forcibly performing HDR and super resolution operations on these areas causes image aliasing and blurring, reducing dual camera imaging quality.

SUMMARY

Embodiments of the present invention provide an image processing method and a dual camera system, so as to improve dual camera imaging quality.

According to a first aspect, an image processing method is provided, where the method includes: obtaining a first set including key point descriptors in a first image that is of a to-be-shot scene and that is formed by using a first camera in a dual camera system, and a second set including key point descriptors in a second image that is of the to-be-shot scene and that is formed by using a second camera in the dual camera system, where the first image and the second image are formed at a same moment; pairing, based on a similarity of the key point descriptors, a key point in the first set and a key point in the second set that match each other to form a key point pair, where paired key points in the first set are in a one-to-one correspondence with paired key points in the second set, and each key point pair includes one key point in the first set and a matched key point in the second set; selecting, according to depth information of the first image and the second image, the key point pair that meets a predetermined condition, where the depth information of the first image and the second image is used to describe a depth of a pixel in the first image and the second image at a spatial location corresponding to the to-be-shot scene; generating an image alignment vector field according to the selected key point pair, where the image alignment vector field is a vector field that is formed by an image alignment vector of a pixel in the first image relative to a corresponding pixel in the second image, and an image alignment vector of a first pixel in the first image relative to a second pixel in the second image is a vector obtained by subtracting coordinates of the first pixel from coordinates of the second pixel; and estimating an occlusion area in the first image and the second image according to the depth information of the first image and the second image, and eliminating an alignment vector of the occlusion area in the image alignment vector field, to form a corrected image alignment vector field, where an image in the occlusion area of the first image is invisible in the second image, and an image in the occlusion area of the second image is invisible in the first image.

With reference to the first aspect, in a first possible implementation, the depth information of the first image and the second image includes information about a first-type area and a second-type area of the first image, and information about a first-type area and a second-type area of the second image, the first-type area is an area in which the depth of the pixel is greater than or equal to a predetermined threshold, and the second-type area is an area in which the depth of the pixel is less than the predetermined threshold; and the predetermined condition is: the key point pair is selected if a key point that belongs to the first image in the key point pair is located in the first-type area of the first image, and a key point that belongs to the second image is located in the first-type area of the second image, or a key point that belongs to the first image in the key point pair is located in the second-type area of the first image, and a key point that belongs to the second image is located in the second-type area of the second image.

With reference to the first possible implementation of the first aspect, in a second possible implementation, the estimating an occlusion area in the first image and the second image according to the depth information of the first image and the second image specifically includes: determining an area that the first-type area of the first image overlaps the second-type area of the second image as the occlusion area, and/or determining an area that the second-type area of the second image overlaps the first-type area of the first image as the occlusion area.

With reference to the first aspect, or the first possible implementation of the first aspect, or the second possible implementation of the first aspect, in a third possible implementation, the generating an image alignment vector field according to the selected key point pair specifically includes: constructing multiple Delaunay triangles according to key points that belong to the second image in selected key point pairs; determining an image alignment vector of each vertex of the multiple Delaunay triangles according to coordinates of the key point of the first image and coordinates of the key point of the second image in the selected key point pair; and calculating an image alignment vector of each pixel in the second image based on the image alignment vector of each vertex of the multiple Delaunay triangles, to form the image alignment vector field.

With reference to the third possible implementation of the first aspect, in a fourth possible implementation, the calculating an image alignment vector of each pixel in the second image based on the Delaunay triangle of the second image specifically includes:

using a formula $$V = \sum_{i=1}^{3} W_i * V_i$$

to indicate an image alignment vector V of a pixel P in a first Delaunay triangle of the multiple Delaunay triangles, where $$(W_1 \quad W_2 \quad W_3)^T = \begin{pmatrix} P_1 \cdot P_1 & P_1 \cdot P_2 & P_1 \cdot P_3 \\ P_1 \cdot P_2 & P_2 \cdot P_2 & P_2 \cdot P_3 \\ P_1 \cdot P_3 & P_2 \cdot P_3 & P_3 \cdot P_3 \end{pmatrix}^{-1} \cdot \begin{pmatrix} P_1 \cdot P \\ P_2 \cdot P \\ P_3 \cdot P \end{pmatrix},$$

the pixels P1, P2, and P3 are respectively vertex coordinates in the first Delaunay triangle, and are two-dimensional rectangular coordinates, the image alignment vectors V1, V2, and V3 are respectively image alignment vectors of the pixels P1, P2, and P3, and Pi·Pj indicates a dot product of coordinates Pi and Pj.

With reference to the third possible implementation of the first aspect, in a fifth possible implementation, the calculating an image alignment vector of each pixel in the second image based on the Delaunay triangle specifically includes:

using a formula $$V = \sum_{i=1}^{3} W_i * V_i$$

to indicate an image alignment vector V of a pixel P in a polygon formed by an extension line of an outermost second Delaunay triangle of the multiple Delaunay triangles and a boundary of the second image, where $$(W_1 \quad W_2 \quad W_3)^T = \begin{pmatrix} P_1 \cdot P_1 & P_1 \cdot P_2 & P_1 \cdot P_3 \\ P_1 \cdot P_2 & P_2 \cdot P_2 & P_2 \cdot P_3 \\ P_1 \cdot P_3 & P_2 \cdot P_3 & P_3 \cdot P_3 \end{pmatrix}^{-1} \cdot \begin{pmatrix} P_1 \cdot P \\ P_2 \cdot P \\ P_3 \cdot P \end{pmatrix},$$

the pixels P1, P2, and P3 are respectively vertex coordinates in the second Delaunay triangle, and are two-dimensional rectangular coordinates, the image alignment vectors V1, V2, and V3 are respectively image alignment vectors of the pixels P1, P2, and P3, and Pi·Pj indicates a dot product of coordinates Pi and Pj.

According to a second aspect, a dual camera system is provided, including:

an obtaining unit, configured to obtain a first set including key point descriptors in a first image that is of a to-be-shot scene and that is formed by using a first camera in a dual camera system, and a second set including key point descriptors in a second image that is of the to-be-shot scene and that is formed by using a second camera in the dual camera system; a matching unit, configured to pair, based on a similarity of the key point descriptors, a key point in the first set and a key point in the second set that match each other to form a key point pair, where paired key points in the first set are in a one-to-one correspondence with paired key points in the second set, and each key point pair includes one key point in the first set and a matched key point in the second set; a selection unit, configured to select, according to depth information of the first image and the second image, the key point pair that meets a predetermined condition, where the depth information of the first image and the second image is used to describe a depth of a pixel in the first image and the second image at a spatial location corresponding to the to-be-shot scene; a generation unit, configured to generate an image alignment vector field according to the selected key point pair, where the image alignment vector field is a vector field that is formed by an image alignment vector of a pixel in the first image relative to a corresponding pixel in the second image, and an image alignment vector of a first pixel in the first image relative to a second pixel in the second image is a vector obtained by subtracting coordinates of the first pixel from coordinates of the second pixel; and a correction unit, configured to: estimate an occlusion area in the first image and the second image according to the depth information of the first image and the second image, and eliminate an alignment vector of the occlusion area in the image alignment vector field, to form a corrected image alignment vector field, where an image in the occlusion area of the first image is invisible in the second image, and an image in the occlusion area of the second image is invisible in the first image.

With reference to the second aspect, in a first possible implementation, the depth information of the first image and the second image includes information about a first-type area and a second-type area of the first image, and information about a first-type area and a second-type area of the second image, the first-type area is an area in which the depth of the pixel is greater than or equal to a predetermined threshold, and the second-type area is an area in which the depth of the pixel is less than the predetermined threshold; and the predetermined condition is: the key point pair is selected if a key point that belongs to the first image in the key point pair is located in the first-type area of the first image, and a key point that belongs to the second image is located in the first-type area of the second image, or a key point that belongs to the first image in the key point pair is located in the second-type area of the first image, and a key point that belongs to the second image is located in the second-type area of the second image.

With reference to the first possible implementation of the second aspect, in a second possible implementation, in a process of estimating an occlusion area in the first image and the second image according to the depth information of the first image and the second image, the correction unit is specifically configured to: determine an area that a background area of the first image overlaps a foreground area of the second image as the occlusion area, or determine an area that a background area of the second image overlaps a foreground area of the first image as the occlusion area.

With reference to the second aspect, or the first possible implementation of the second aspect, or the second possible implementation of the second aspect, in a third possible implementation, the generation unit is specifically configured to: construct multiple Delaunay triangles according to key points that belong to the second image in selected key point pairs; determine an image alignment vector of each vertex of the multiple Delaunay triangles according to coordinates of the key point of the first image and coordinates of the key point of the second image in the selected key point pair; and calculate an image alignment vector of each pixel in the second image based on the image alignment vector of each vertex of the multiple Delaunay triangles, to form the image alignment vector field.

With reference to the third possible implementation of the second aspect, in a fourth possible implementation, in a process of calculating an image alignment vector of each pixel in the second image based on the Delaunay triangle of the second image, the generation unit is specifically configured to:

obtain an image alignment vector V of a pixel P in a first Delaunay triangle of the multiple Delaunay triangles by using a formula $$V = \sum_{i=1}^{3} W_i * V_i,$$

where $$(W_1 \quad W_2 \quad W_3)^T = \begin{pmatrix} P_1 \cdot P_1 & P_1 \cdot P_2 & P_1 \cdot P_3 \\ P_1 \cdot P_2 & P_2 \cdot P_2 & P_2 \cdot P_3 \\ P_1 \cdot P_3 & P_2 \cdot P_3 & P_3 \cdot P_3 \end{pmatrix}^{-1} \cdot \begin{pmatrix} P_1 \cdot P \\ P_2 \cdot P \\ P_3 \cdot P \end{pmatrix},$$

the pixels P1, P2, and P3 are respectively vertex coordinates in the first Delaunay triangle, and are two-dimensional rectangular coordinates, the image alignment vectors V1, V2, and V3 are respectively image alignment vectors of the pixels P1, P2, and P3, and Pi·Pj indicates a dot product of coordinates Pi and Pj.

With reference to the third possible implementation of the second aspect, in a fifth possible implementation, in a process of calculating an image alignment vector of each pixel in the second image based on the Delaunay triangle of the second image, the generation unit is specifically configured to:

obtain, by using a formula $$V = \sum_{i=1}^{3} W_i * V_i,$$

an image alignment vector V of a pixel P in a polygon formed by an extension line of an outermost second Delaunay triangle of the multiple Delaunay triangles and a boundary of the second image, where $$(W_1 \quad W_2 \quad W_3)^T = \begin{pmatrix} P_1 \cdot P_1 & P_1 \cdot P_2 & P_1 \cdot P_3 \\ P_1 \cdot P_2 & P_2 \cdot P_2 & P_2 \cdot P_3 \\ P_1 \cdot P_3 & P_2 \cdot P_3 & P_3 \cdot P_3 \end{pmatrix}^{-1} \cdot \begin{pmatrix} P_1 \cdot P \\ P_2 \cdot P \\ P_3 \cdot P \end{pmatrix},$$

the pixels P1, P2, and P3 are respectively vertex coordinates in the second Delaunay triangle, and are two-dimensional rectangular coordinates, the image alignment vectors V1, V2, and V3 are respectively image alignment vectors of the pixels P1, P2, and P3, and Pi·Pj indicates a dot product of coordinates Pi and Pj.

According to a third aspect, a dual camera system is provided, where the system includes: a processor, a memory, and a camera, where the camera includes a first camera and a second camera; the memory includes a read only memory and a random access memory, and is configured to: store a program, and provide a computer operation instruction and data for the processor; and the processor is configured to execute the program stored in the memory, and is specifically configured to perform the following method: obtaining a first set including key point descriptors in a first image that is of a to-be-shot scene and that is formed by using a first camera in a dual camera system, and a second set including key point descriptors in a second image that is of the to-be-shot scene and that is formed by using a second camera in the dual camera system, where the first image and the second image are formed at a same moment; pairing, based on a similarity of the key point descriptors, a key point in the first set and a key point in the second set that match each other to form a key point pair, where paired key points in the first set are in a one-to-one correspondence with paired key points in the second set, and each key point pair includes one key point in the first set and a matched key point in the second set; selecting, according to depth information of the first image and the second image, the key point pair that meets a predetermined condition, where the depth information of the first image and the second image is used to describe a depth of a pixel in the first image and the second image at a spatial location corresponding to the to-be-shot scene; generating an image alignment vector field according to the selected key point pair, where the image alignment vector field is a vector field that is formed by an image alignment vector of a pixel in the first image relative to a corresponding pixel in the second image, and an image alignment vector of a first pixel in the first image relative to a second pixel in the second image is a vector obtained by subtracting coordinates of the first pixel from coordinates of the second pixel; and estimating an occlusion area in the first image and the second image according to the depth information of the first image and the second image, and eliminating an alignment vector of the occlusion area in the image alignment vector field, to form a corrected image alignment vector field, where an image in the occlusion area of the first image is invisible in the second image, and an image in the occlusion area of the second image is invisible in the first image.

With reference to the third aspect, in a first possible implementation, the depth information of the first image and the second image includes information about a first-type area and a second-type area of the first image, and information about a first-type area and a second-type area of the second image, the first-type area is an area in which the depth of the pixel is greater than or equal to a predetermined threshold, and the second-type area is an area in which the depth of the pixel is less than the predetermined threshold; and the predetermined condition is: the key point pair is selected if a key point that belongs to the first image in the key point pair is located in the first-type area of the first image, and a key point that belongs to the second image is located in the first-type area of the second image, or a key point that belongs to the first image in the key point pair is located in the second-type area of the first image, and a key point that belongs to the second image is located in the second-type area of the second image.

With reference to the first possible implementation of the third aspect, in a second possible implementation, in a process of estimating an occlusion area in the first image and the second image according to the depth information of the first image and the second image, the processor is specifically configured to: determine an area that the first-type area of the first image overlaps the second-type area of the second image as the occlusion area, and/or determine an area that the second-type area of the second image overlaps the first-type area of the first image as the occlusion area.

With reference to the third aspect, or the first possible implementation of the third aspect, or the second possible implementation of the third aspect, in a third possible implementation, in a process of generating an image alignment vector field according to the selected key point pair, the processor is specifically configured to: construct multiple Delaunay triangles according to key points that belong to the second image in selected key point pairs; determine an image alignment vector of each vertex of the multiple Delaunay triangles according to coordinates of the key point of the first image and coordinates of the key point of the second image in the selected key point pair; and calculate an image alignment vector of each pixel in the second image based on the image alignment vector of each vertex of the multiple Delaunay triangles.

With reference to the third possible implementation of the third aspect, in a fourth possible implementation, in a process of calculating an image alignment vector of each pixel in the second image based on the Delaunay triangle of the second image, the processor is specifically configured to:

use a formula $$V = \sum_{i=1}^{3} W_i * V_i$$

to indicate an image alignment vector V of a pixel P in a first Delaunay triangle of the multiple Delaunay triangles, where $$(W_1 \quad W_2 \quad W_3)^T = \begin{pmatrix} P_1 \cdot P_1 & P_1 \cdot P_2 & P_1 \cdot P_3 \\ P_1 \cdot P_2 & P_2 \cdot P_2 & P_2 \cdot P_3 \\ P_1 \cdot P_3 & P_2 \cdot P_3 & P_3 \cdot P_3 \end{pmatrix}^{-1} \cdot \begin{pmatrix} P_1 \cdot P \\ P_2 \cdot P \\ P_3 \cdot P \end{pmatrix},$$

the pixels P1, P2, and P3 are respectively vertex coordinates in the first Delaunay triangle, and are two-dimensional rectangular coordinates, the image alignment vectors V1, V2, and V3 are respectively image alignment vectors of the pixels P1, P2, and P3, and Pi·Pj indicates a dot product of coordinates Pi and Pj.

With reference to the third possible implementation of the third aspect, in a fifth possible implementation, in a process of calculating an image alignment vector of each pixel in the second image based on the Delaunay triangle of the second image, the processor is specifically configured to:

use a formula $$V = \sum_{i=1}^{3} W_i * V_i$$

to indicate an image alignment vector V of a pixel P in a polygon formed by an extension line of an outermost second Delaunay triangle of the multiple Delaunay triangles and a boundary of the second image, where $$(W_1 \quad W_2 \quad W_3)^T = \begin{pmatrix} P_1 \cdot P_1 & P_1 \cdot P_2 & P_1 \cdot P_3 \\ P_1 \cdot P_2 & P_2 \cdot P_2 & P_2 \cdot P_3 \\ P_1 \cdot P_3 & P_2 \cdot P_3 & P_3 \cdot P_3 \end{pmatrix}^{-1} \cdot \begin{pmatrix} P_1 \cdot P \\ P_2 \cdot P \\ P_3 \cdot P \end{pmatrix},$$

the pixels P1, P2, and P3 are respectively vertex coordinates in the second Delaunay triangle, and are two-dimensional rectangular coordinates, the image alignment vectors V1, V2, and V3 are respectively image alignment vectors of the pixels P1, P2, and P3, and Pi·Pj indicates a dot product of coordinates Pi and Pj.

According to a fourth aspect, a computer readable storage medium is provided, where the computer readable storage medium stores one or more programs, the one or more programs include an instruction, and when executed by a portable electronic device that includes multiple application programs, the instruction enables the portable electronic device to perform the following method: obtaining a first set including key point descriptors in a first image that is of a to-be-shot scene and that is formed by using a first camera in a dual camera system, and a second set including key point descriptors in a second image that is of the to-be-shot scene and that is formed by using a second camera in the dual camera system, where the first image and the second image are formed at a same moment; pairing, based on a similarity of the key point descriptors, a key point in the first set and a key point in the second set that match each other to form a key point pair, where paired key points in the first set are in a one-to-one correspondence with paired key points in the second set, and each key point pair includes one key point in the first set and a matched key point in the second set; selecting, according to depth information of the first image and the second image, the key point pair that meets a predetermined condition, where the depth information of the first image and the second image is used to describe a depth of a pixel in the first image and the second image at a spatial location corresponding to the to-be-shot scene; generating an image alignment vector field according to the selected key point pair, where the image alignment vector field is a vector field that is formed by an image alignment vector of a pixel in the first image relative to a corresponding pixel in the second image, and an image alignment vector of a first pixel in the first image relative to a second pixel in the second image is a vector obtained by subtracting coordinates of the first pixel from coordinates of the second pixel; and estimating an occlusion area in the first image and the second image according to the depth information of the first image and the second image, and eliminating an alignment vector of the occlusion area in the image alignment vector field, to form a corrected image alignment vector field, where an image in the occlusion area of the first image is invisible in the second image, and an image in the occlusion area of the second image is invisible in the first image.

With reference to the fourth aspect, in a first possible implementation, the depth information of the first image and the second image includes information about a first-type area and a second-type area of the first image, and information about a first-type area and a second-type area of the second image, the first-type area is an area in which the depth of the pixel is greater than or equal to a predetermined threshold, and the second-type area is an area in which the depth of the pixel is less than the predetermined threshold; and the predetermined condition is: the key point pair is selected if a key point that belongs to the first image in the key point pair is located in the first-type area of the first image, and a key point that belongs to the second image is located in the first-type area of the second image, or a key point that belongs to the first image in the key point pair is located in the second-type area of the first image, and a key point that belongs to the second image is located in the second-type area of the second image.

With reference to the first possible implementation of the fourth aspect, in a second possible implementation, the estimating an occlusion area in the first image and the second image according to the depth information of the first image and the second image specifically includes: determining an area that the first-type area of the first image overlaps the second-type area of the second image as the occlusion area, and/or determining an area that the second-type area of the second image overlaps the first-type area of the first image as the occlusion area.

With reference to the fourth aspect, or the first possible implementation of the fourth aspect, or the second possible implementation of the fourth aspect, in a third possible implementation, the generating an image alignment vector field according to the selected key point pair specifically includes: constructing multiple Delaunay triangles according to key points that belong to the second image in selected key point pairs; determining an image alignment vector of each vertex of the multiple Delaunay triangles according to coordinates of the key point of the first image and coordinates of the key point of the second image in the selected key point pair; and calculating an image alignment vector of each pixel in the second image based on the image alignment vector of each vertex of the multiple Delaunay triangles.

With reference to the third possible implementation of the fourth aspect, in a fourth possible implementation, the calculating an image alignment vector of each pixel in the second image based on the Delaunay triangle of the second image specifically includes:

using a formula $$V = \sum_{i=1}^{3} W_i * V_i$$

to indicate an image alignment vector V of a pixel P in a first Delaunay triangle of the multiple Delaunay triangles, where $$(W_1 \quad W_2 \quad W_3)^T = \begin{pmatrix} P_1 \cdot P_1 & P_1 \cdot P_2 & P_1 \cdot P_3 \\ P_1 \cdot P_2 & P_2 \cdot P_2 & P_2 \cdot P_3 \\ P_1 \cdot P_3 & P_2 \cdot P_3 & P_3 \cdot P_3 \end{pmatrix}^{-1} \cdot \begin{pmatrix} P_1 \cdot P \\ P_2 \cdot P \\ P_3 \cdot P \end{pmatrix},$$

the pixels P1, P2, and P3 are respectively vertex coordinates in the first Delaunay triangle, and are two-dimensional rectangular coordinates, the image alignment vectors V1, V2, and V3 are respectively image alignment vectors of the pixels P1, P2, and P3, and Pi·Pj indicates a dot product of coordinates Pi and Pj.

With reference to the third possible implementation of the fourth aspect, in a fifth possible implementation, the calculating an image alignment vector of each pixel in the second image based on the Delaunay triangle of the second image specifically includes:

using a formula $$V = \sum_{i=1}^{3} W_i * V_i$$

to indicate an image alignment vector V of a pixel P in a polygon formed by an extension line of an outermost second Delaunay triangle of the multiple Delaunay triangles and a boundary of the second image, where $$(W_1 \quad W_2 \quad W_3)^T = \begin{pmatrix} P_1 \cdot P_1 & P_1 \cdot P_2 & P_1 \cdot P_3 \\ P_1 \cdot P_2 & P_2 \cdot P_2 & P_2 \cdot P_3 \\ P_1 \cdot P_3 & P_2 \cdot P_3 & P_3 \cdot P_3 \end{pmatrix}^{-1} \cdot \begin{pmatrix} P_1 \cdot P \\ P_2 \cdot P \\ P_3 \cdot P \end{pmatrix},$$

the pixels P1, P2, and P3 are respectively vertex coordinates in the second Delaunay triangle, and are two-dimensional rectangular coordinates, the image alignment vectors V1, V2, and V3 are respectively image alignment vectors of the pixels P1, P2, and P3, and Pi·Pj indicates a dot product of coordinates Pi and Pj.

According to the image processing method and the dual camera system in the embodiments of the present invention, in a process of filtering the key point pairs and correcting the image alignment vector of the occlusion area, the depth information of the dual camera is used twice, so that the image alignment vector field may be accurately estimated and impact of the occlusion area may be eliminated, thereby avoiding occurrence of image blurring or aliasing in HDR and super resolution operations.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Delaunay (Delaunay) triangle grid is a set of a series of connected but not overlapping triangles, and circumcircles of theses triangles do not include any other point in this region. The Delaunay triangle grid has two specific properties:

(1) The circumcircle of each Delaunay (Delaunay) triangle does not include any other point in a region, and this is referred to as an empty circumcircle property of the Delaunay (Delaunay) triangle grid. This property is used as a judgment criterion for creating a Delaunay (Delaunay) triangle grid.

(2) The other property is the max-min angle property: after mutually exchanging a diagonal of a convex quadrilateral formed by every two adjacent triangles, a minimum angle of six interior angles no longer increases.

$$\vec{a} = (x_1, y_1) \text{ and } \vec{b} = (x_2, y_2)$$

Dot product: if there are two vectors in two-dimensional space, a dot product (which is also referred to as an inner product or a scalar product) of the two vectors is defined as the following real number:

$$\vec{a} \cdot \vec{b} = x_1 x_2 + y_1 y_2.$$

In this embodiment of the present invention, the vector is indicated by two-dimensional rectangular coordinates, and a dot product of coordinates Pi (xi, yi) and coordinates Pj (xj, yj) is indicated by the following formula: Pi·Pj=(xi, yi) (xj, yj)=xi*xj+yi*yj.

Figures 1A, 1B:
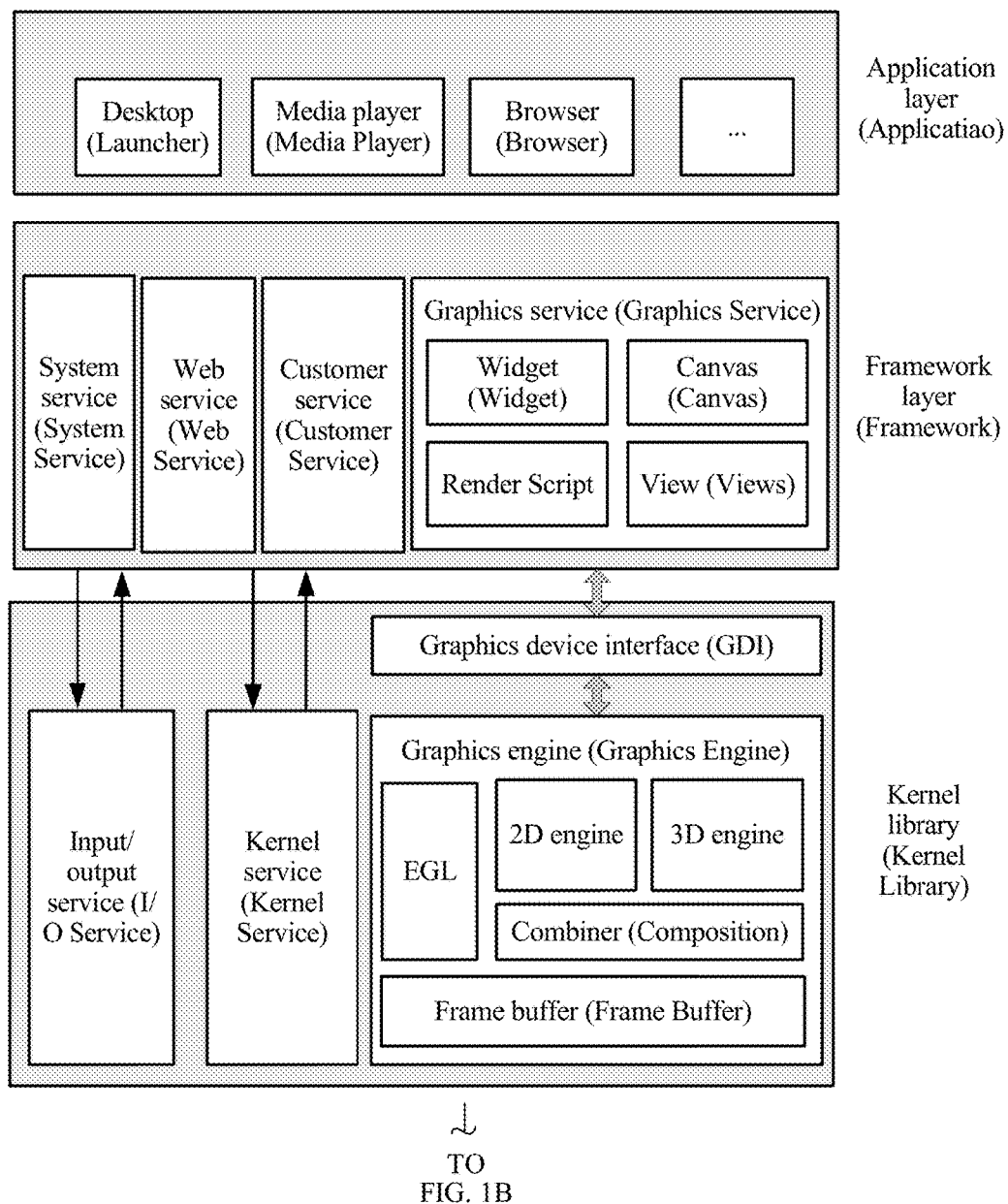
FIG. 1A and FIG. 1B are a system block diagram of an image processing terminal device according to an embodiment of the present invention.
Figure 1B:
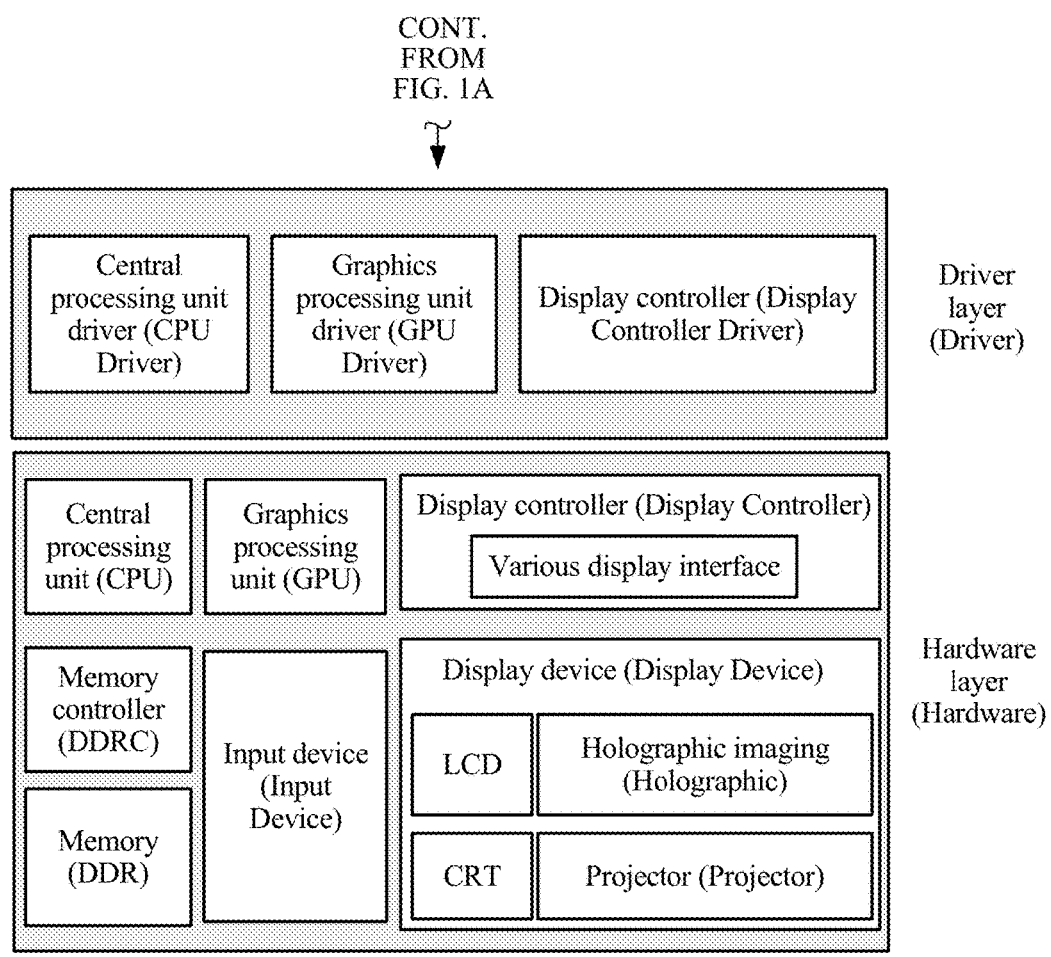

FIG. 1A and FIG. 1B are used as an example to describe a logical structure of a computing node to which an image processing method is applied according to an embodiment of the present invention. The computing node may be a terminal device, and the terminal device may be specifically a camera, or a smartphone with a camera function, or the like. As shown in FIG. 1A and FIG. 1B, a hardware layer of the terminal device includes a CPU, a GPU, and the like. Certainly, the hardware layer of the terminal device may further include a memory, an input/output device, a memory, a memory controller, a network interface, and the like. The input device may include a keyboard, a mouse, a touchscreen, and the like. The output device may include a display device, such as an LCD, a CRT, holographic imaging (Holographic), a projector (Projector), and the like. An operating system (such as Android) and some application programs may run at the hardware layer. A kernel library is a core part of the operating system, and includes an input/output service, a kernel service, a graphics device interface, a graphics engine (Graphics Engine) that implements graphics processing of the CPU and the GPU, and the like. The graphics engine may include a 2D engine, a 3D engine, a combiner (Composition), a frame buffer (Frame Buffer), an EGL, and the like. In addition, the terminal further includes a driver layer, a framework layer, and an application layer. The driver layer may include a CPU driver, a GPU driver, a display controller driver, and the like. The framework layer may include a graphics service (Graphic Service), a system service (System service), a web service (Web Service), a customer service (Customer Service), and the like. The graphics service may include a widget (Widget), a canvas (Canvas), a view (Views), a Render Script, and the like. The application layer may include a desktop (launcher), a media player (Media Player), a browser (Browser), and the like.

In the example of FIG. 1A and FIG. 1B, the image processing method provided in this embodiment of the present invention is applied to a computing node, and the computing node may be a terminal device. A hardware layer of the terminal device may include hardware such as a processor (for example, a central processing unit (Center Processing Unit, CPU), a graphics processing unit (Graphic Processing Unit, GPU)), a display controller (Display Controller), a memory, a memory controller, an input device, and a display device. A kernel library (Kernel Library) may include an input/output service (I/O service), a kernel service (Kernel Service), and a graphics engine (Graphic Engine). It may be understood that for a logical structure of an execution body of the method in this embodiment of the present invention, refer to FIG. 1A and FIG. 1B.

Figure 2:
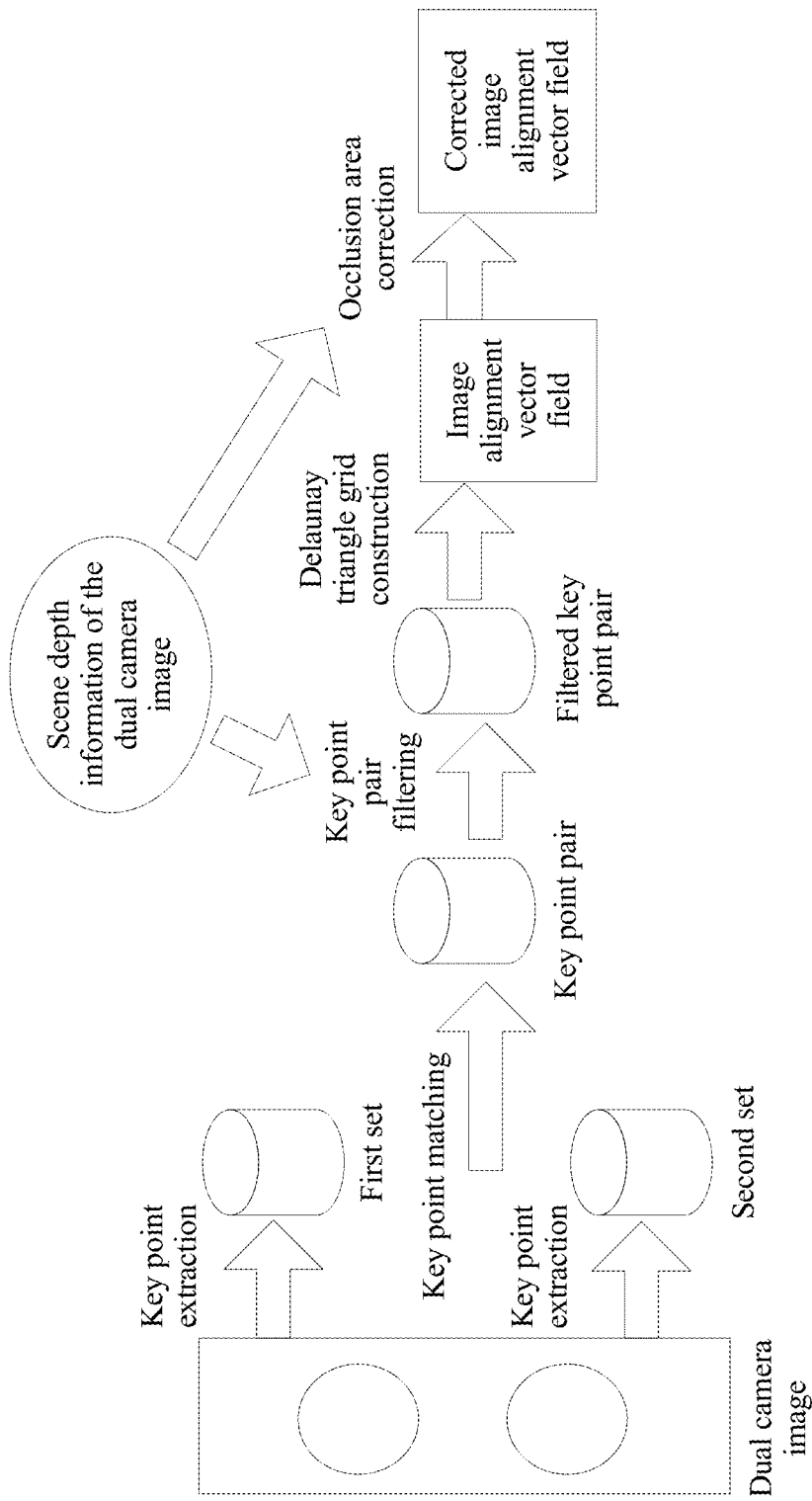
FIG. 2 is a schematic diagram of a process of aligning a dual camera image according to an embodiment of the present invention.

FIG. 2 is a schematic diagram of a process of aligning a dual camera image according to an embodiment of the present invention. As shown in FIG. 2, for a dual camera image collected by the dual camera system, sets of key point descriptors corresponding to two images are separately formed by extracting key points, and then matched key point pairs are formed by matching the key points. The filtered key point pairs are obtained by means of filtering based on depth information of the two images, and then grid construction is performed on the filtered key point pairs based on the depth information, to form a preliminary image alignment vector field. A corrected image alignment vector field is formed by correcting an occlusion area. With reference to FIG. 2, the following describes the method in this embodiment of the present invention.

Figure 3:
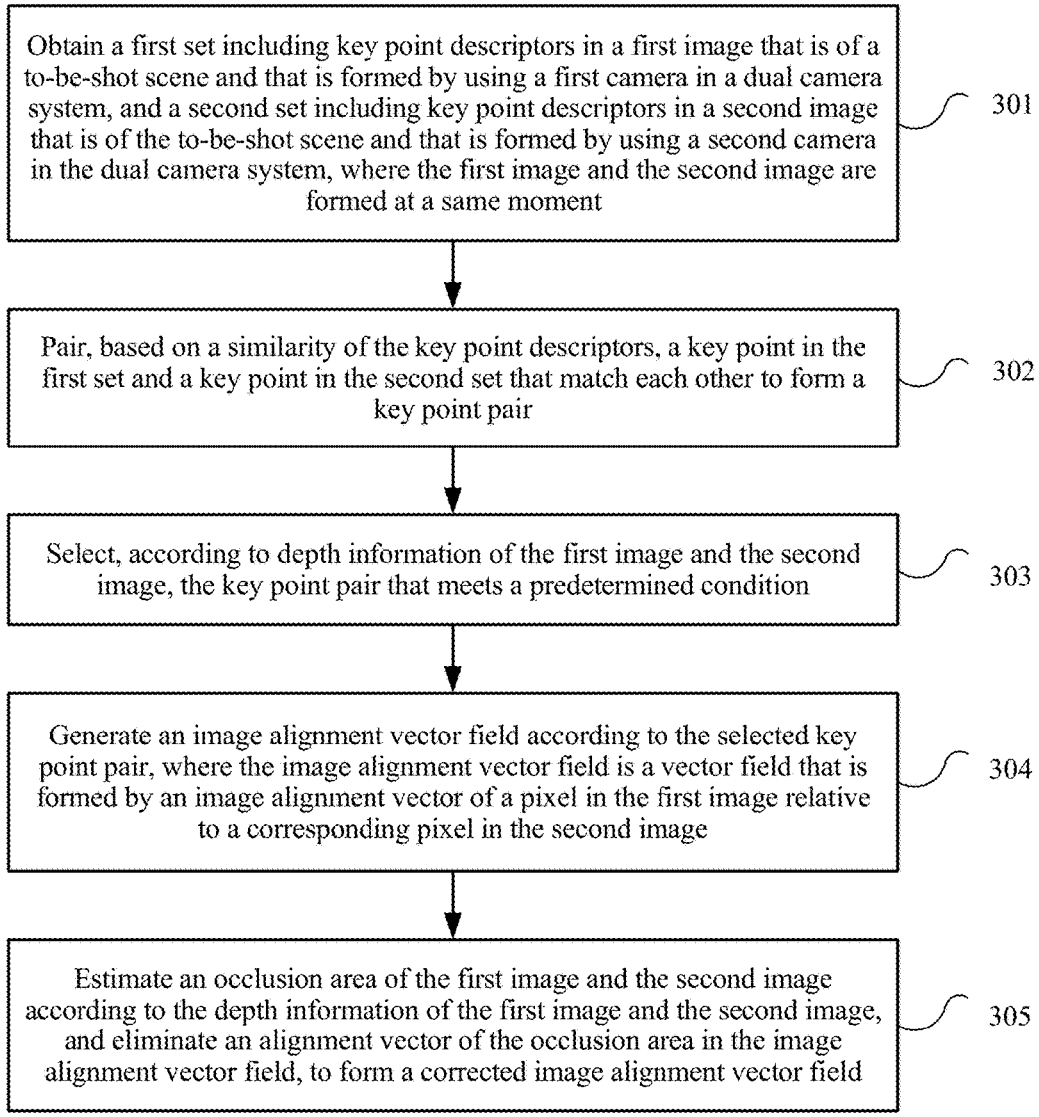
FIG. 3 is a flowchart of an image processing method according to an embodiment of the present invention.

FIG. 3 is a flowchart of an image processing method according to an embodiment of the present invention. The method in FIG. 3 is performed by an image processing apparatus.

301. Obtain a first set including key point descriptors in a first image that is of a to-be-shot scene and that is formed by using a first camera in a dual camera system, and a second set including key point descriptors in a second image that is of the to-be-shot scene and that is formed by using a second camera in the dual camera system, where the first image and the second image are formed at a same moment.

In the dual camera system, images are collected by using two cameras, and a final image is generated based on the images of the to-be-shot scene that are collected by the two cameras.

The two cameras are referred to as a first camera and a second camera. Images collected by the first camera and the second camera are obviously collected at a same moment. A first image collected by the first camera is denoted as M, and a second image collected by the second camera is denoted as N.

The dual camera system may separately extract the first set $P_M = \{(x_i, y_i, d_i)\}$ from the image M and the second set $P_N = \{(x_j, y_j, d_j)\}$ from the image N by means of key point detection and corresponding feature description of the key points. (x, y) is coordinates of a location of the key point, and d is a corresponding feature description.

Step 301 is corresponding to the step "key point extraction" in FIG. 2. In FIG. 2, the sets of key point descriptors (that is, the first set and the second set in step 301) are generated by performing the step "key point extraction".

It should be understood that for the method for positioning a key point, and obtaining a key point descriptor of the key point, refer to the prior art. For example, a location of the key point is calculated by using a scale invariant feature transform (Scale Invariant Feature Transform) matching algorithm. In the method for obtaining the key point descriptor, for example, information such as a location, a scale, and a direction that are of the key point may be calculated, and then a group of vectors are used to describe the key point, where the key point descriptor may include a vector of the key point, and include a vector of a pixel that makes a contribution to the key point and that is around the key point. The key point descriptor may be used as a basis for object matching.

302. Pair, based on a similarity of the key point descriptors, a key point in the first set and a key point in the second set that match each other to form a key point pair.

Paired key points in the first set are in a one-to-one correspondence with paired key points in the second set, and each key point pair includes one key point in the first set and a matched key point in the second set.

It should be understood that when the key points of the first image and the second image are paired, one key point of the first image is corresponding to a maximum of one key point of the second image, one key point of the second image can be corresponding to a maximum of only one key point of the first image, and the matched two key points in the first image and the second image form one key point pair.

For a specific implementation of matching the key points of the first image and the second image according to a feature description of the key point descriptor, refer to the prior-art method. Details are not described in this embodiment of the present invention.

Step 302 is corresponding to the step "key point matching" in FIG. 2. In FIG. 2, a key point pair (the key point pair in step 302) is generated by means of "key point matching".

303. Select, according to depth information of the first image and the second image, the key point pair that meets a predetermined condition.

The depth information of the first image and the second image is used to describe a depth of a pixel of the first image and the second image at a spatial location corresponding to the to-be-shot scene.

Step 303 is corresponding to the step "key point pair filtering" in FIG. 2. In FIG. 2, with reference to depth information of a dual camera image, a key point pair that meets a condition is selected by performing the step "key point pair filtering", to obtain a filtered key point pair (that is, the key point pair that meets the predetermined condition in step 303).

Figure 4:
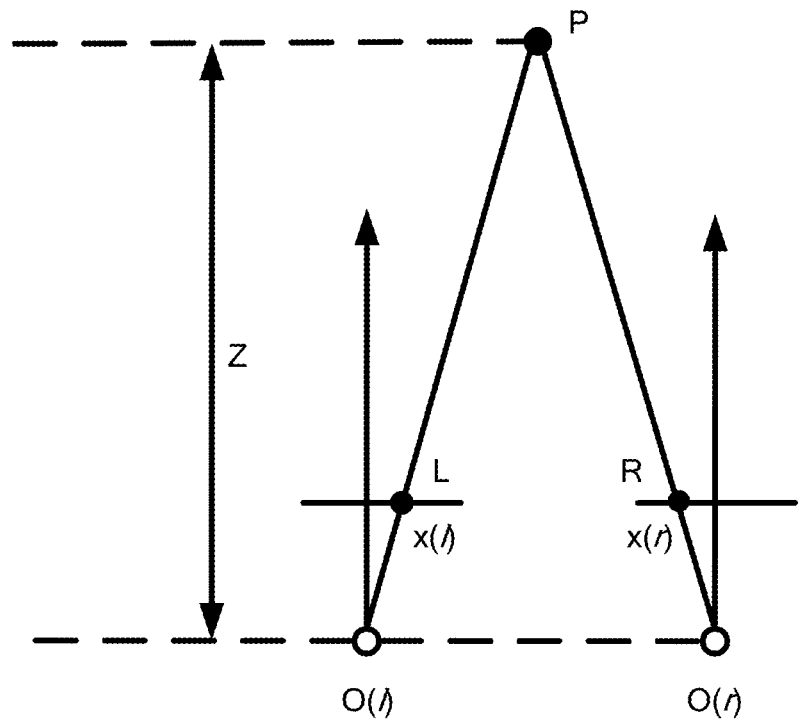
FIG. 4 is a schematic diagram of a depth of a dual camera system according to an embodiment of the present invention.

FIG. 4 is a schematic diagram of a depth of a dual camera system according to an embodiment of the present invention. As shown in FIG. 4, O(l) and O(r) respectively indicate a first camera and a second camera, P indicates a point in a scene, x(l) indicates coordinates of an imaging point L of the point P in the first camera, x(r) indicates coordinates of an imaging point R of the point P in the second camera, and Z indicates a depth of the point P, where a value of Z is generally a distance of the point P relative to a connection line of the first camera and the second camera. For a depth calculation method, refer to the prior art. Details are not described in this embodiment of the present invention.

It should be understood that before step 302, the method may further include: obtaining depth information of a first image and a second image. It should be understood that in this embodiment of the present invention, the depth information may be a depth corresponding to a pixel in the image, or depth-related status information obtained by means of calculation according to the depth. For example, different types of areas are divided according to different depths.

Optionally, the depth information of the first image and the second image includes information about a first-type area and a second-type area of the first image, and information about a first-type area and a second-type area of the second image, the first-type area is an area in which the depth of the pixel is greater than or equal to a predetermined threshold, and the second-type area is an area in which the depth of the pixel is less than the predetermined threshold; and the predetermined condition is: the key point pair is selected if a key point that belongs to the first image in the key point pair is located in the first-type area of the first image, and a key point that belongs to the second image is located in the first-type area of the second image, or a key point that belongs to the first image in the key point pair is located in the second-type area of the first image, and a key point that belongs to the second image is located in the second-type area of the second image. In other words, step 302 may be specifically implemented as follows: The key point pair is selected if a key point that belongs to the first image in the key point pair is located in the first-type area of the first image, and a key point that belongs to the second image is located in the first-type area of the second image, or a key point that belongs to the first image in the key point pair is located in the second-type area of the first image, and a key point that belongs to the second image is located in the second-type area of the second image.

In a specific implementation, areas corresponding to the scene in the first image and the second image may be divided into two types of areas according to depths of points in the scene. For example, a depth that is equal to $Z_0$ may be used as a boundary, pixels whose depths are greater than $Z_0$ are classified into a first-type area (that is, a background area), and pixels whose depths are less than $Z_0$ are classified into a second-type area (that is, a foreground area). All pixels whose depths are equal to $Z_0$ may be classified into the first-type area, or may be classified into the second-type area.

It should be understood that a value of the predetermined threshold depends on a depth of a to-be-shot scene. For example, the predetermined threshold may be equal to an average depth of the to-be-shot scene.

It is assumed that imaging of the first camera is an image M and imaging of the second camera is an image N. In this case, the predetermined threshold (for example, the average depth of the to-be-shot scene) is used as a boundary, an area of the image M may be simply divided into a first-type area (that is, a background area) and a second-type area (that is, a foreground area), and an area of the image N is divided into a first-type area (that is, a background area) and a second-type area (that is, a foreground area).

For a key point $P_i=(x_i, y_i, d_i)$ in the image M, the image N is searched for a corresponding matched point $Q_j=(x_j, y_j, d_j)$. A foreground area and a background area of an image may be roughly segmented based on dual camera depth information. It is assumed that the foreground area of the image M is $F_M$ and the background area is $B_M$; and the foreground area of the image N is $F_N$ and the background area is $B_N$. For a location relationship combination of the key point pair Pi and Qj, four combinations are as follows:

$$P_i \in F_M, Q_j \in F_N \quad (1)$$

$$P_i \in F_M, Q_j \in B_N \quad (2)$$

$$P_i \in B_M, Q_j \in F_N \quad (3)$$

$$P_i \in B_M, Q_j \in B_N \quad (4)$$

where, $P_i \in F_M$ and $P_i \in B_M$ respectively indicate that $P_i$ is located in the foreground area and the background area of the image M, and a meaning of another formula is similar to this.

Due to existence of parallax of a dual camera, the background area close to a foreground object in the image M may be occluded by an object in the image N, or the background area close to the foreground object in the image N may be occluded by the object in the image M. In the image collected by the dual camera, the matched key points must be both located in the foreground area or the background area. Therefore, the key point pairs formed by the combination (2) and the combination (3) may be filtered out, and the key point pairs formed by the combination (1) and the combination (4) may be selected and reserved.

In other words, when the key point pairs are filtered, the key point pair that meets the following condition is selected and reserved: a key point that belongs to the first image in the key point pair is located in the foreground area of the first image, and a key point that belongs to the second image in the key point pair is located in the foreground area of the second image; or the key point that belongs to the first image in the key point pair is located in the background area of the first image, and the key point that belongs to the second image in the key point pair is located in the background area of the second image.

Figure 5:
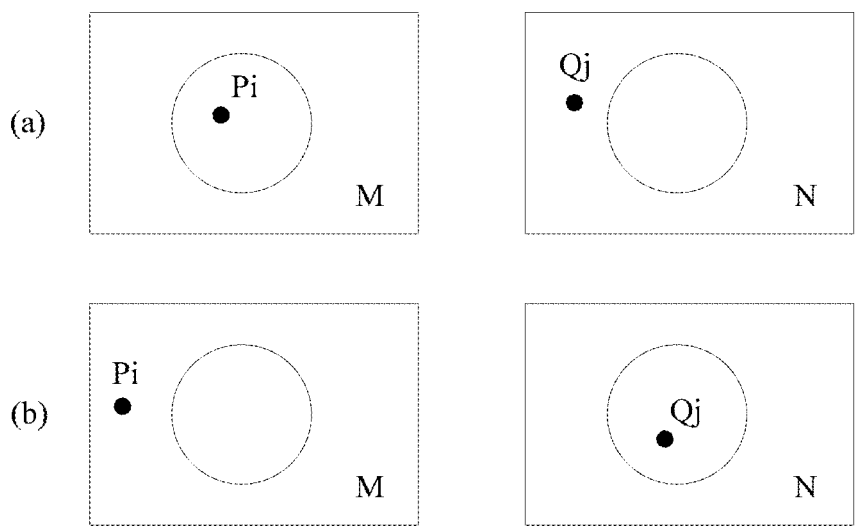
FIG. 5 is a schematic diagram of incorrect key point pairing according to an embodiment of the present invention.

FIG. 5 is a schematic diagram of incorrect key point pairing according to an embodiment of the present invention. FIG. 5 is used as an example for description. In FIG. 5, a circular area is a foreground area, and the other part is a background area. As shown in (a) in FIG. 5, for a key point Pi in a background area of an image M, if a matched key point Qj is located in a foreground area of an image N, this type of key point pairing is incorrect, and should be discarded. As shown in (b) in FIG. 5, for a key point Pi in a foreground area of the image M, if a matched key point Qj is located in a background area of the image N, this type of key point pairing is also incorrect, and should be discarded.

304. Generate an image alignment vector field according to a selected key point pair.

The image alignment vector field is a vector field formed by an image alignment vector of a pixel in the first image relative to a corresponding pixel in the second image.

It should be understood that an image alignment vector of a first pixel in the first image relative to a second pixel in the second image is a vector obtained by subtracting coordinates of the first pixel from coordinates of the second pixel. As shown in FIG. 4, for each pixel x(l) of the first camera, a corresponding imaging point x(r) of the second camera is found by means of image matching, and d=x(r)−x(l) is an image alignment vector of a pixel of the first camera at a location x(l) relative to a pixel of the second camera at a location x(r). Each pixel has a corresponding image alignment vector, all pixels of an image form an image alignment vector field of the image.

Specifically, step 304 may be implemented as follows: Multiple Delaunay triangles are constructed according to key points that belong to the second image in selected key point pairs; an image alignment vector of each vertex of the multiple Delaunay triangles is determined according to coordinates of the key point of the first image and coordinates of the key point of the second image in the selected key point pair; and an image alignment vector of each pixel in the second image is calculated based on the image alignment vector of each vertex of the multiple Delaunay triangles, to form the image alignment vector field.

The image N and the image M are used as an example below to describe a process of constructing an image alignment vector field of the image N relative to the image M.

To align a dual camera image to perform a super resolution or HDR operation, an alignment vector of the key point pair Pi=(xi, yi) and Qj=(xj, yj) of the image M and the image N may be estimated, that is, Vi=(xj−xi, yj−yi). Therefore, a key point alignment vector field {(Pi, Vi)} of the image N relative to the image M is constructed.

Figure 6:
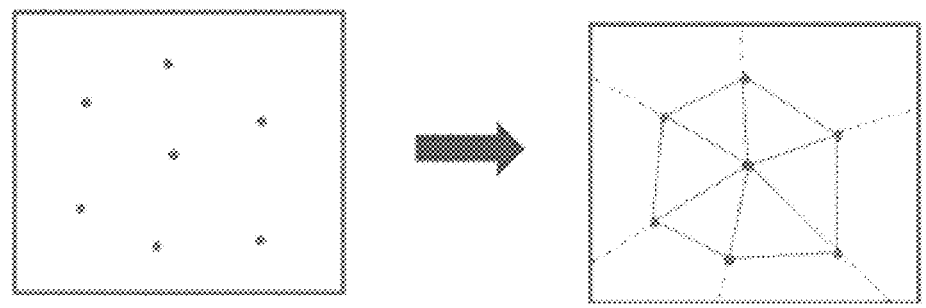
FIG. 6 is a schematic diagram of grid coverage based on a key point according to the present invention.

Based on all key points Pi of the image M, a triangle grid that covers the entire image is constructed by using a Delaunay triangularization rule, a boundary is extended by an extension line of a triangle to implement polygon grid coverage. FIG. 6 is a schematic diagram of grid coverage based on a key point according to the present invention. As shown in FIG. 6, points on the left side are key points of an image M, and an image on the right side is a schematic diagram after a Delaunay triangle grid of the image M is constructed. The image M may be segmented into multiple Delaunay triangles and multiple polygons by constructing a Delaunay triangle according to the key points of the image M. Each polygon is a polygon formed by an extension line of a Delaunay triangle that is located at the edge and a boundary of the image M.

Figure 7:
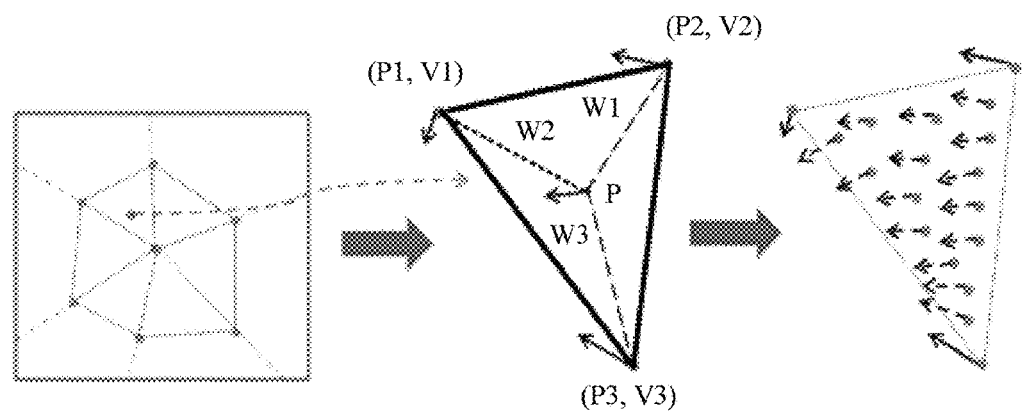
FIG. 7 is a schematic diagram of estimating an alignment vector of a pixel inside a Delaunay triangle according to an embodiment of the present invention.

FIG. 7 is a schematic diagram of estimating an alignment vector of a pixel inside a Delaunay triangle according to an embodiment of the present invention. It is assumed that vertexes of any constructed Delaunay triangle in an image M are expressed as {(P1, V1), (P2, V2), and (P3, V3)}. For any pixel (P, V) inside the triangle, based on a local continuity hypothesis and a linear hypothesis, as shown in FIG. 7, an alignment vector corresponding to the pixel may be expressed as $$V = \sum_{i=1}^{3} W_i * V_i,$$

and Wi is calculated as follows:

$$(W_1 \quad W_2 \quad W_3)^T = \begin{pmatrix} P_1 \cdot P_1 & P_1 \cdot P_2 & P_1 \cdot P_3 \\ P_1 \cdot P_2 & P_2 \cdot P_2 & P_2 \cdot P_3 \\ P_1 \cdot P_3 & P_2 \cdot P_3 & P_3 \cdot P_3 \end{pmatrix}^{-1} \cdot \begin{pmatrix} P_1 \cdot P \\ P_2 \cdot P \\ P_3 \cdot P \end{pmatrix}.$$

In the foregoing formula, P, P1, P2, and P3 are two-dimensional rectangular coordinates, and Pi·Pj indicates a dot product of coordinates Pi and Pj. For example, if coordinates of P1 are (x1, y1) and coordinates of P2 are (x2, y2), P1·P2=(x1, y1)·(x2, y2)=x1*x2+y1*y2. A dot product operation formula used below is similar to this, and details are not described.

Figure 8:
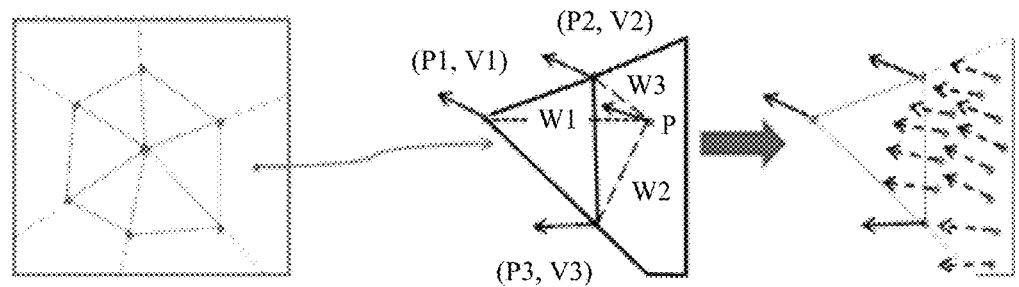
FIG. 8 is a schematic diagram of estimating an alignment vector of a pixel inside a polygon that is adjacent to a Delaunay triangle according to an embodiment of the present invention.

FIG. 8 is a schematic diagram of estimating an alignment vector of a pixel inside a polygon that is adjacent to a Delaunay triangle according to an embodiment of the present invention. Any pixel (P, V) outside the Delaunay triangle must be located in a polygon that extension lines of two sides of a Delaunay triangle intersect boundaries of an image. It is assumed that vertexes of a corresponding Delaunay triangle are {(P1, V1), (P2, V2), (P3, V3)}. For any pixel (P, V) inside the polygon, based on a local continuity hypothesis and a linear hypothesis, as shown in FIG. 8, an alignment vector corresponding to the pixel may be expressed as $$V = \sum_{i=1}^{3} W_i * V_i,$$

and Wi is calculated as follows:

$$(W_1 \ W_2 \ W_3)^T = \begin{pmatrix} P_1 \cdot P_1 & P_1 \cdot P_2 & P_1 \cdot P_3 \\ P_1 \cdot P_2 & P_2 \cdot P_2 & P_2 \cdot P_3 \\ P_1 \cdot P_3 & P_2 \cdot P_3 & P_3 \cdot P_3 \end{pmatrix}^{-1} \cdot \begin{pmatrix} P_1 \cdot P \\ P_2 \cdot P \\ P_3 \cdot P \end{pmatrix}.$$

An alignment vector field of an image M may be calculated based on a local linear hypothesis and a smoothness hypothesis.

Step 304 is corresponding to step "Delaunay triangle grid construction" in FIG. 2. In FIG. 2, an image alignment vector field (that is, the image alignment vector field in step 304) is generated by means of "Delaunay triangle grid construction".

305. Estimate an occlusion area of the first image and the second image according to the depth information of the first image and the second image, and eliminate an alignment vector of the occlusion area in the image alignment vector field, to form a corrected image alignment vector field.

An image of an occlusion area of the first image is invisible in the second image, and an image of an occlusion area of the second image is invisible in the first image.

Because of a depth difference of the to-be-shot scene and a difference between angles of view for collecting images by the first camera and the second camera, imaging of a part of the scene in the to-be-shot scene is only in a first area of the first image or a first area of the second image, so that the first area of the first image is the occlusion area of the first image, the first area of the second image is the occlusion area of the second image.

It should be understood that there is a one-to-one correspondence between pixels of the to-be-shot scene that are visible in both the first image and the second image. If an image of one occlusion area of the first image is invisible in the second image, an image of an area that is in the second image and that is corresponding to the occlusion area is invisible in the first image. In other words, an area that is in the second image and that is corresponding to the occlusion area of the first image is an occlusion area of the second image.

Figure 9:
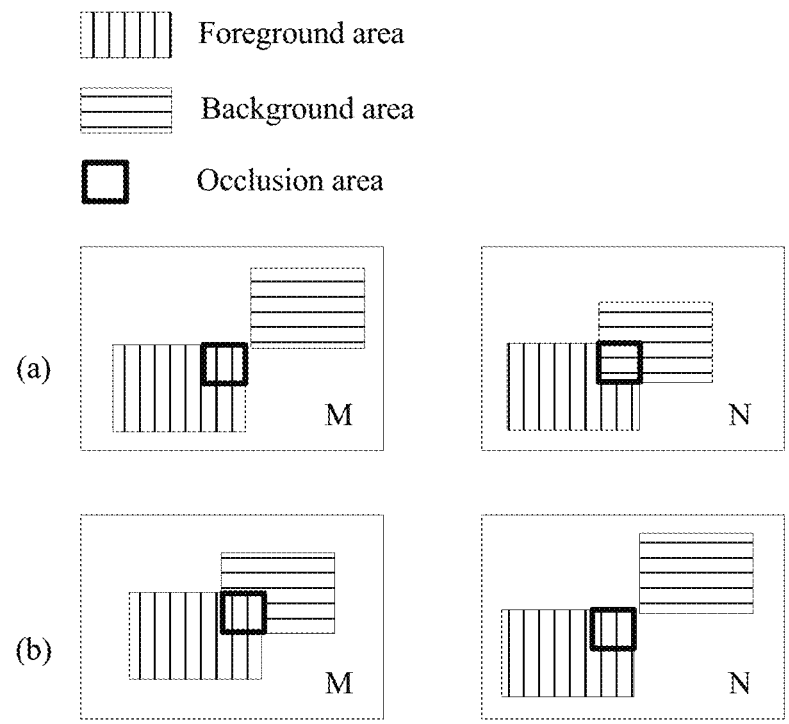
FIG. 9 is a schematic diagram of an occlusion area of a dual camera image according to an embodiment of the present invention.

For ease of understanding the occlusion area, FIG. 9 is used as an example for description.

FIG. 9 is a schematic diagram of an occlusion area of a dual camera image according to an embodiment of the present invention. Due to a location difference of a dual camera, there must be a difference between angles of view of an image M and an image N and consequently a local area is occluded, as shown in FIG. 9. There are two cases of occlusion: (a) a part of a background area of the image M is occluded by a foreground area in the image N; and (b) a part of the occluded background area of the image M is visible in the image N. These overlapping areas in the image M are collectively referred to as an occlusion area of the image M, and these overlapping areas in the image N are collectively referred to as an occlusion area of the image N.

It should be understood that at edges of the two images, because of differences between collection areas, a part of the scene may exist only in the first image or only in the second image, and this type of area is not an occlusion area.

An area corresponding to the occlusion area is not found in the other image of the dual camera, and therefore an alignment vector of the occlusion area must be missing. However, there may be an error in the key point pair obtained by means of calculation according to a matching algorithm. Therefore, a matched key point pair may be found in the occlusion area, and an image alignment vector of the occlusion area is further obtained. Therefore, the image alignment vector of the occlusion area needs to be cleared.

Figure 10:
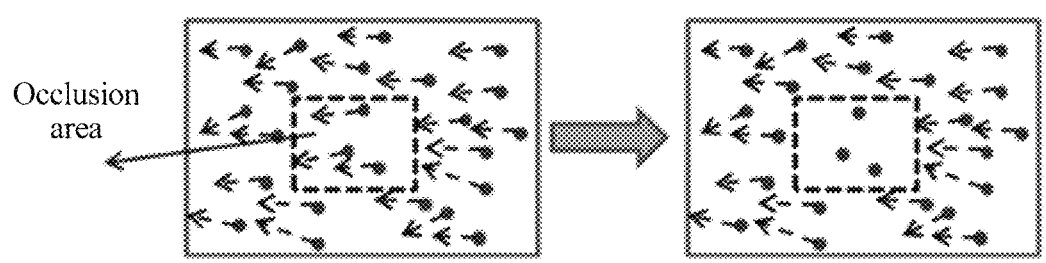
FIG. 10 is a schematic diagram of correcting an alignment vector of an occlusion area according to an embodiment of the present invention.

In this case, an image alignment vector field may be corrected by using depth information of the dual camera again. In a process of alignment of the image N relative to the image M, for each pixel P of the image M, an alignment vector V corresponding to the pixel P may be obtained in the image alignment vector field. A matched pixel of P in the image N may be calculated as Q=P+V. A foreground area FM and the background area BM of the image M, and the foreground area FN and a background area BN of the image N may be obtained based on the depth information of the dual camera. If P∈FM, and Q∈BN, or P∈BM, and Q∈FN, it may be learned that an M foreground pixel matches an N background pixel, or an M background pixel matches an N foreground pixel. An area in which these pixels are located is generally corresponding to the foregoing occlusion area. For the pixels that meet these conditions, an alignment vector field of the pixels must be eliminated. FIG. 10 is a schematic diagram of correcting an alignment vector of an occlusion area according to an embodiment of the present invention. An inner small box area is an occlusion area. For this area, an alignment vector field of this area should be eliminated, which is shown in FIG. 10.

In a process of alignment of the image N relative to the image M, a corrected image alignment vector field may be obtained based on the foregoing technical solution. If there is no vector field correction, foreground and background aliasing of the image in the occlusion area inevitably exists in a subsequent HDR or super resolution operation, and HDR or super resolution result image quality is reduced. A relatively safe method is: eliminating the alignment vector field of the occlusion area of the image M; and searching a non-occlusion area for a matched pixel in the image N based on the image alignment vector field, to participate in the HDR and super resolution operations. A feathering processing and another image processing are performed on the occlusion area, so that transition between the occlusion area and the non-occlusion area is natural. Therefore, incorrect HDR and super resolution operations are avoided in a partial occlusion area, and imaging quality of the dual camera image is improved.

Step 305 is corresponding to step "occlusion area correction" in FIG. 2. In FIG. 2, with reference to the depth information of the dual camera image, the corrected image alignment vector field (that is, the corrected image alignment vector field in step 305) is generated by means of "occlusion area correction".

After the corrected image alignment vector field is obtained, an image may be generated based on the image alignment vector field. For a specific implementation, refer to the prior art. Details are not described in this embodiment of the present invention.

Certainly, it should be understood that the method in this embodiment of the present invention may further be applied to an embodiment of dividing a first image and a second image into more types of areas according to a depth of a to-be-shot scene. In this case, key point pairs selected for generating an image alignment vector field must be in a same type of area of the first image and the second image; if there is an overlapping area in one type of area of the first image and another type of area in the second image, the overlapping area is an occlusion area. Another implementation step is similar to the method in this embodiment of the present invention, and details are not described. These embodiments should fall within the protection scope of the present invention.

In this embodiment of the present invention, in a process of filtering the key point pairs and correcting the image alignment vector of the occlusion area, the depth information of the dual camera is used twice, so that the image alignment vector field may be accurately estimated and impact of the occlusion area may be eliminated, thereby avoiding occurrence of image blurring or aliasing in the HDR and super resolution operations.

Figure 11:
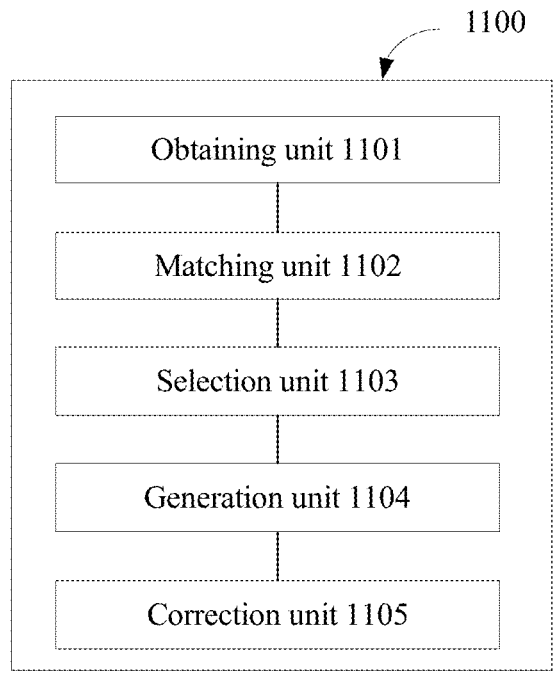
FIG. 11 is a schematic structural diagram of a dual camera system according to an embodiment of the present invention.

FIG. 11 is a schematic structural diagram of a dual camera system 1100 according to an embodiment of the present invention. The dual camera system 1100 may include:

an obtaining unit 1101, configured to obtain a first set including key point descriptors in a first image that is of a to-be-shot scene and that is formed by using a first camera in the dual camera system 1100, and a second set including key point descriptors in a second image that is of the to-be-shot scene and that is formed by using a second camera in the dual camera system 1100, where the first image and the second image are formed at a same moment;

a matching unit 1102, configured to pair, based on a similarity of the key point descriptors, a key point in the first set and a key point in the second set that match each other to form a key point pair, where paired key points in the first set are in a one-to-one correspondence with paired key points in the second set, and each key point pair includes one key point in the first set and a matched key point in the second set;

a selection unit 1103, configured to select, according to depth information of the first image and the second image, the key point pair that meets a predetermined condition, where the depth information of the first image and the second image is used to describe a depth of a pixel in the first image and the second image at a spatial location corresponding to the to-be-shot scene;

a generation unit 1104, configured to generate an image alignment vector field according to the selected key point pair, where the image alignment vector field is a vector field that is formed by an image alignment vector of a pixel in the first image relative to a corresponding pixel in the second image, where an image alignment vector of a first pixel in the first image relative to a second pixel in the second image is a vector obtained by subtracting coordinates of the first pixel from coordinates of the second pixel; and a correction unit 1105, configured to: estimate an occlusion area of the first image and the second image according to the depth information of the first image and the second image, and eliminate an alignment vector of the occlusion area in the image alignment vector field, to form a corrected image alignment vector field, where an image of an occlusion area of the first image is invisible in the second image, and an image of an occlusion area of the second image is invisible in the first image.

In this embodiment of the present invention, in a process of filtering the key point pairs and correcting the image alignment vector of the occlusion area, the dual camera system 1100 uses the depth information of the dual camera twice, so that the image alignment vector field may be accurately estimated and impact of the occlusion area may be eliminated, thereby avoiding occurrence of image blurring or aliasing in HDR and super resolution operations.

Optionally, the depth information of the first image and the second image includes information about a first-type area and a second-type area of the first image, and information about a first-type area and a second-type area of the second image, the first-type area is an area in which the depth of the pixel is greater than or equal to a predetermined threshold, and the second-type area is an area in which the depth of the pixel is less than the predetermined threshold; and the predetermined condition is: the key point pair is selected if a key point that belongs to the first image in the key point pair is located in the first-type area of the first image, and a key point that belongs to the second image is located in the first-type area of the second image, or a key point that belongs to the first image in the key point pair is located in the second-type area of the first image, and a key point that belongs to the second image is located in the second-type area of the second image. In other words, the selection unit 1103 is specifically configured to: select the key point pair if a key point that belongs to the first image in the key point pair is located in the first-type area of the first image, and a key point that belongs to the second image is located in the first-type area of the second image, or a key point that belongs to the first image in the key point pair is located in the second-type area of the first image, and a key point that belongs to the second image is located in the second-type area of the second image, to generate the image alignment vector field by using the generation unit 1104.

Further, in a process of estimating an occlusion area in the first image and the second image according to the depth information of the first image and the second image, the correction unit 1105 is specifically configured to:

determine an area that a background area of the first image overlaps a foreground area of the second image as the occlusion area, or determine an area that a background area of the second image overlaps a foreground area of the first image as the occlusion area.

Optionally, the generation unit 1104 is specifically configured to: construct multiple Delaunay triangles according to key points that belong to the second image in the selected key point pairs; determine an image alignment vector of each vertex of the multiple Delaunay triangles according to coordinates of the key point of the first image and coordinates of the key point of the second image in the selected key point pair; and calculate an image alignment vector of each pixel in the second image based on the image alignment vector of each vertex of the multiple Delaunay triangles, to form the image alignment vector field.

Optionally, in a process of calculating an image alignment vector of each pixel in the second image based on the image alignment vector of each vertex of the multiple Delaunay triangles, to form the image alignment vector field, the generation unit 1104 is specifically configured to:

obtain an image alignment vector V of a pixel P in a first Delaunay triangle of the multiple Delaunay triangles by using a formula $$V = \sum_{i=1}^{3} W_i * V_i,$$

where $$(W_1 \; W_2 \; W_3)^T = \begin{pmatrix} P_1 \cdot P_1 & P_1 \cdot P_2 & P_1 \cdot P_3 \\ P_1 \cdot P_2 & P_2 \cdot P_2 & P_2 \cdot P_3 \\ P_1 \cdot P_3 & P_2 \cdot P_3 & P_3 \cdot P_3 \end{pmatrix}^{-1} \cdot \begin{pmatrix} P_1 \cdot P \\ P_2 \cdot P \\ P_3 \cdot P \end{pmatrix},$$

the pixels P1, P2, and P3 are respectively vertex coordinates in the first Delaunay triangle, and the image alignment vectors V1, V2, and V3 are respectively image alignment vectors of the pixels P1, P2, and P3.

Alternatively, optionally, in a process of calculating an image alignment vector of each pixel in the second image based on the image alignment vector of each vertex of the multiple Delaunay triangles, to form the image alignment vector field, the generation unit 1104 is specifically configured to:

obtain, by using a formula $$V = \sum_{i=1}^{3} W_i * V_i,$$

an image alignment vector V of a pixel P in a polygon formed by an extension line of an outermost second Delaunay triangle of the multiple Delaunay triangles and a boundary of the second image, where $$(W_1 \; W_2 \; W_3)^T = \begin{pmatrix} P_1 \cdot P_1 & P_1 \cdot P_2 & P_1 \cdot P_3 \\ P_1 \cdot P_2 & P_2 \cdot P_2 & P_2 \cdot P_3 \\ P_1 \cdot P_3 & P_2 \cdot P_3 & P_3 \cdot P_3 \end{pmatrix}^{-1} \cdot \begin{pmatrix} P_1 \cdot P \\ P_2 \cdot P \\ P_3 \cdot P \end{pmatrix},$$

the pixels P1, P2, and P3 are respectively vertex coordinates in the second Delaunay triangle, and the image alignment vectors V1, V2, and V3 are respectively image alignment vectors of the pixels P1, P2, and P3.

The dual camera system 1100 may further perform the method in FIG. 2 or FIG. 3, and implement functions of the dual camera system in the embodiment shown in FIG. 3. Details are not described in this embodiment of the present invention.

Figure 12:
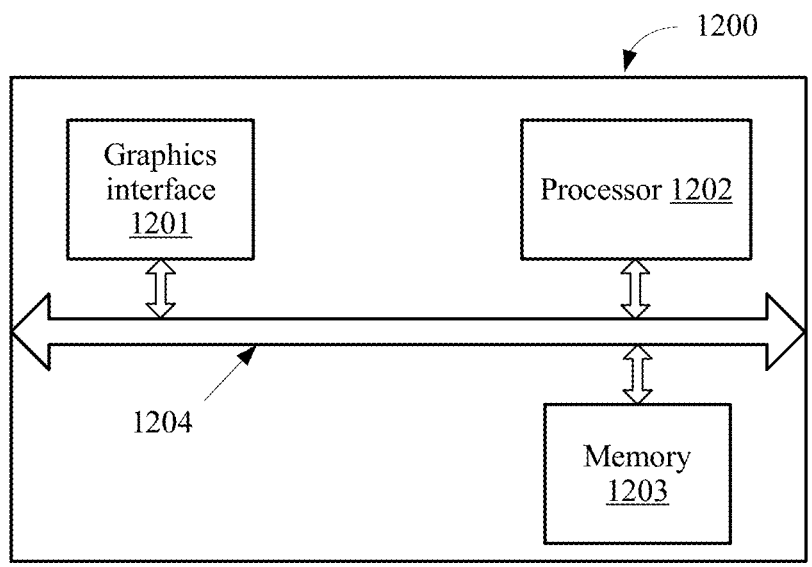
FIG. 12 is another schematic structural diagram of a dual camera system according to an embodiment of the present invention.

FIG. 12 is a schematic structural diagram of a dual camera system 1200 according to an embodiment of the present invention. The image processing 1200 may include a graphics interface 1201, a processor 1202, and a memory 1203.

The graphics interface 1201, the processor 1202, and the memory 1203 are connected to each other by using a bus system 1204. The bus 1204 may be an ISA bus, a PCI bus, an EISA bus, or the like. The bus may be classified into an address bus, a data bus, a control bus, and the like. For ease of denotation, in FIG. 12, the bus 1204 is indicated by using only one double-headed arrow; however, it does not indicate that there is only one bus or only one type of bus.

The graphics interface 1201 is configured to implement external image collection of the dual camera system 1200. In this embodiment of the present invention, the graphics interface 1201 may include a first camera and a second camera.

The memory 1203 is configured to store a program. Specifically, the program may include program code, and the program code includes a computer operation instruction. The memory 1203 may include a read-only memory and a random access memory, and provides an instruction and data for the processor 1202. The memory 1203 may include a high-speed RAM memory, and may further include a non-volatile memory (non-volatile memory) such as at least one disk memory.

The processor 1202 executes the program stored in the memory 1203 and is specifically configured to perform the following operations:

obtaining a first set including key point descriptors in a first image that is of a to-be-shot scene and that is formed by using the first camera in the dual camera system 1200, and a second set including key point descriptors in a second image that is of the to-be-shot scene and that is formed by using the second camera in the dual camera system 1200, where the first image and the second image are formed at a same moment;

pairing, based on a similarity of the key point descriptors, a key point in the first set and a key point in the second set that match each other to form a key point pair, where paired key points in the first set are in a one-to-one correspondence with paired key points in the second set, and each key point pair includes one key point in the first set and a matched key point in the second set;

selecting, according to depth information of the first image and the second image, the key point pair that meets a predetermined condition, where the depth information of the first image and the second image is used to describe a depth of a pixel in the first image and the second image at a spatial location corresponding to the to-be-shot scene;

generating an image alignment vector field according to the selected key point pair, where the image alignment vector field is a vector field that is formed by an image alignment vector of a pixel in the first image relative to a corresponding pixel in the second image, and an image alignment vector of a first pixel in the first image relative to a second pixel in the second image is a vector obtained by subtracting coordinates of the first pixel from coordinates of the second pixel; and estimating an occlusion area in the first image and the second image according to the depth information of the first image and the second image, and eliminating an alignment vector of the occlusion area in the image alignment vector field, to form a corrected image alignment vector field, where an image in the occlusion area of the first image is invisible in the second image, and an image in the occlusion area of the second image is invisible in the first image.

The foregoing method that is disclosed in any of the embodiments in FIG. 2 and FIG. 3 of the present invention and performed by the dual camera system may be applied to the processor 1202 or implemented by the processor 1202. The processor 1202 may be an integrated circuit chip and has a signal processing capability. In an implementation process, the steps in the foregoing methods may be completed by means of an integrated logic circuit of hardware in the processor 1202 or an instruction in a form of software. The foregoing processor 1202 may be a general purpose processor, including a central processing unit (Central Processing Unit, CPU for short), a network processor (Network Processor, NP for short), and the like, or may be a digital signal processor (DSP), an application-specific integrated circuit (ASIC), a field programmable gate array (FPGA), another programmable logical device, a discrete gate, or a transistor logic device, or a discrete hardware component.

The processor 1202 may implement or perform methods, steps, and logical block diagrams disclosed in the embodiments of the present invention. The general purpose processor may be a microprocessor or this processor may be any conventional processor, or the like. The steps of the method disclosed with reference to the embodiments of the present invention may be directly performed and completed by a hardware decoding processor, or performed and completed by a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 1203. The processor 1202 reads information in the memory 1203, and completes the steps of the foregoing method in combination with hardware of the processor 1202.

In this embodiment of the present invention, in a process of filtering the key point pairs and correcting the image alignment vector of the occlusion area, the dual camera system 1200 uses the depth information of the dual camera twice, so that the image alignment vector field may be accurately estimated and impact of the occlusion area may be eliminated, thereby avoiding occurrence of image blurring or aliasing in HDR and super resolution operations.

Optionally, the depth information of the first image and the second image includes information about a first-type area and a second-type area of the first image, and information about a first-type area and a second-type area of the second image, the first-type area is an area in which the depth of the pixel is greater than or equal to a predetermined threshold, and the second-type area is an area in which the depth of the pixel is less than the predetermined threshold; and the predetermined condition is: the key point pair is selected if a key point that belongs to the first image in the key point pair is located in the first-type area of the first image, and a key point that belongs to the second image is located in the first-type area of the second image, or a key point that belongs to the first image in the key point pair is located in the second-type area of the first image, and a key point that belongs to the second image is located in the second-type area of the second image.

In other words, in a process of selecting, according to the depth information of the first image and the second image, the key point pair that meets the predetermined condition, the processing unit 1202 is specifically configured to:

select the key point pair if a key point that belongs to the first image in the key point pair is located in the first-type area of the first image, and a key point that belongs to the second image is located in the first-type area of the second image, or a key point that belongs to the first image in the key point pair is located in the second-type area of the first image, and a key point that belongs to the second image is located in the second-type area of the second image.

Further, in a process of estimating an occlusion area in the first image and the second image according to the depth information of the first image and the second image, the processing unit 1202 is specifically configured to:

determine an area that a background area of the first image overlaps a foreground area of the second image as the occlusion area, or determine an area that a background area of the second image overlaps a foreground area of the first image as the occlusion area.

Optionally, in a process of generating an image alignment vector field according to the selected key point pair, the processing unit 1202 is specifically configured to: construct multiple Delaunay triangles according to key points that belong to the second image in selected key point pairs; determine an image alignment vector of each vertex of the multiple Delaunay triangles according to coordinates of the key point of the first image and coordinates of the key point of the second image in the selected key point pair; and calculate an image alignment vector of each pixel in the second image based on the image alignment vector of each vertex of the multiple Delaunay triangles, to form the image alignment vector field.

Optionally, in a process of calculating an image alignment vector of each pixel in the second image based on the Delaunay triangle of the second image, the processing unit 1202 is specifically configured to:

obtain an image alignment vector V of a pixel P in a first Delaunay triangle of the multiple Delaunay triangles by using a formula $$V = \sum_{i=1}^{3} W_i * V_i,$$

where $$(W_1 \; W_2 \; W_3)^T = \begin{pmatrix} P_1 \cdot P_1 & P_1 \cdot P_2 & P_1 \cdot P_3 \\ P_1 \cdot P_2 & P_2 \cdot P_2 & P_2 \cdot P_3 \\ P_1 \cdot P_3 & P_2 \cdot P_3 & P_3 \cdot P_3 \end{pmatrix}^{-1} \cdot \begin{pmatrix} P_1 \cdot P \\ P_2 \cdot P \\ P_3 \cdot P \end{pmatrix},$$

the pixels P1, P2, and P3 are respectively vertex coordinates in the first Delaunay triangle, and the image alignment vectors V1, V2, and V3 are respectively image alignment vectors of the pixels P1, P2, and P3.

Alternatively, optionally, in a process of calculating an image alignment vector of each pixel in the second image based on the Delaunay triangle of the second image, the processing unit 1202 is specifically configured to:

obtain, by using a formula $$V = \sum_{i=1}^{3} W_i * V_i,$$

an image alignment vector V of a pixel P in a polygon formed by an extension line of an outermost second Delaunay triangle of the multiple Delaunay triangles and a boundary of the second image, where $$(W_1 \; W_2 \; W_3)^T = \begin{pmatrix} P_1 \cdot P_1 & P_1 \cdot P_2 & P_1 \cdot P_3 \\ P_1 \cdot P_2 & P_2 \cdot P_2 & P_2 \cdot P_3 \\ P_1 \cdot P_3 & P_2 \cdot P_3 & P_3 \cdot P_3 \end{pmatrix}^{-1} \cdot \begin{pmatrix} P_1 \cdot P \\ P_2 \cdot P \\ P_3 \cdot P \end{pmatrix},$$

the pixels P1, P2, and P3 are respectively vertex coordinates in the second Delaunay triangle, and the image alignment vectors V1, V2, and V3 are respectively image alignment vectors of the pixels P1, P2, and P3.

The dual camera system 1200 may further perform the method in FIG. 2 or FIG. 3, and implement functions of the dual camera system in the embodiment shown in FIG. 3. Details are not described in this embodiment of the present invention.

The present invention further provides a computer readable storage medium, where the computer readable storage medium stores one or more programs, the one or more programs include an instruction, and when executed by a portable electronic device that includes multiple application programs, the instruction enables the portable electronic device to perform the following method:

obtaining a first set including key point descriptors in a first image that is of a to-be-shot scene and that is formed by using a first camera in a dual camera system, and a second set including key point descriptors in a second image that is of the to-be-shot scene and that is formed by using a second camera in the dual camera system, where the first image and the second image are formed at a same moment;

pairing, based on a similarity of the key point descriptors, a key point in the first set and a key point in the second set that match each other to form a key point pair, where paired key points in the first set are in a one-to-one correspondence with paired key points in the second set, and each key point pair includes one key point in the first set and a matched key point in the second set;

selecting, according to depth information of the first image and the second image, the key point pair that meets a predetermined condition, where the depth information of the first image and the second image is used to describe a depth of a pixel in the first image and the second image at a spatial location corresponding to the to-be-shot scene;

generating an image alignment vector field according to the selected key point pair, where the image alignment vector field is a vector field that is formed by an image alignment vector of a pixel in the first image relative to a corresponding pixel in the second image, and an image alignment vector of a first pixel in the first image relative to a second pixel in the second image is a vector obtained by subtracting coordinates of the first pixel from coordinates of the second pixel; and estimating an occlusion area in the first image and the second image according to the depth information of the first image and the second image, and eliminating an alignment vector of the occlusion area in the image alignment vector field, to form a corrected image alignment vector field, where an image in the occlusion area of the first image is invisible in the second image, and an image in the occlusion area of the second image is invisible in the first image.

In this embodiment of the present invention, in a process of filtering the key point pairs and correcting the image alignment vector of the occlusion area, the program stored in the computer readable storage medium uses the depth information of the dual camera twice, so that the image alignment vector field may be accurately estimated and impact of the occlusion area may be eliminated, thereby avoiding occurrence of image blurring or aliasing in HDR and super resolution operations.

In addition, the program stored in the computer readable storage medium in this embodiment of the present invention may further perform the method in the embodiment shown in FIG. 2, and implement functions of the dual camera system in the embodiments shown in FIG. 2 and FIG. 3. Details are not described in this embodiment of the present invention.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An image processing method, comprising:
    obtaining a first set comprising key point descriptors in a first image that is of a to-be-shot scene and that is formed by using a first camera in a dual camera system, and a second set comprising key point descriptors in a second image that is of the to-be-shot scene and that is formed by using a second camera in the dual camera system, wherein the first image and the second image are formed at a same moment;
    pairing, based on a similarity of the key point descriptors, a key point in the first set and a key point in the second set that match each other to form a key point pair, wherein paired key points in the first set are in a one-to-one correspondence with paired key points in the second set, and each key point pair comprises one key point in the first set and a matched key point in the second set;
    selecting, according to depth information of the first image and the second image, the key point pair that meets a predetermined condition, wherein the depth information of the first image and the second image is used to describe a depth of a pixel in the first image and the second image at a spatial location corresponding to the to-be-shot scene;
    generating an image alignment vector field according to the selected key point pair, wherein the image alignment vector field is a vector field that is formed by an image alignment vector of a pixel in the first image relative to a corresponding pixel in the second image, and an image alignment vector of a first pixel in the first image relative to a second pixel in the second image is a vector obtained by subtracting coordinates of the first pixel from coordinates of the second pixel; and
    estimating an occlusion area in the first image and the second image according to the depth information of the first image and the second image, and eliminating an alignment vector of the occlusion area in the image alignment vector field, to form a corrected image alignment vector field, wherein an image in the occlusion area of the first image is invisible in the second image, and an image in the occlusion area of the second image is invisible in the first image.

2. The method according to claim 1, wherein
    the depth information of the first image and the second image comprises information about a first-type area and a second-type area of the first image, and information about a first-type area and a second-type area of the second image, the first-type area is an area in which the depth of the pixel is greater than or equal to a predetermined threshold, and the second-type area is an area in which the depth of the pixel is less than the predetermined threshold; and
    the predetermined condition is: the key point pair is selected if a key point that belongs to the first image in the key point pair is located in the first-type area of the first image, and a key point that belongs to the second image is located in the first-type area of the second image, or a key point that belongs to the first image in the key point pair is located in the second-type area of the first image, and a key point that belongs to the second image is located in the second-type area of the second image.

3. The method according to claim 2, wherein the estimating an occlusion area in the first image and the second image according to the depth information of the first image and the second image comprises:
    determining an area that the first-type area of the first image overlaps the second-type area of the second image as the occlusion area, and/or determining an area that the second-type area of the second image overlaps the first-type area of the first image as the occlusion area.

4. The method according to claim 1, wherein the generating an image alignment vector field according to the selected key point pair comprises:
    constructing multiple Delaunay triangles according to key points that belong to the second image in selected key point pairs;
    determining an image alignment vector of each vertex of the multiple Delaunay triangles according to coordinates of the key point of the first image and coordinates of the key point of the second image in the selected key point pair; and
    calculating an image alignment vector of each pixel in the second image based on the image alignment vector of each vertex of the multiple Delaunay triangles, to form the image alignment vector field.

5. The method according to claim 4, wherein the calculating an image alignment vector of each pixel in the second image based on the Delaunay triangle of the second image comprises:
    using a formula $$V = \sum_{i=1}^{3} W_i * V_i$$

to indicate an image alignment vector V of a pixel P in a first Delaunay triangle of the multiple Delaunay triangles, wherein $$(W_1 \ W_2 \ W_3)^T = \begin{pmatrix} P_1 \cdot P_1 & P_1 \cdot P_2 & P_1 \cdot P_3 \\ P_1 \cdot P_2 & P_2 \cdot P_2 & P_2 \cdot P_3 \\ P_1 \cdot P_3 & P_2 \cdot P_3 & P_3 \cdot P_3 \end{pmatrix}^{-1} \cdot \begin{pmatrix} P_1 \cdot P \\ P_2 \cdot P \\ P_3 \cdot P \end{pmatrix},$$

the pixels P1, P2, and P3 are respectively vertex coordinates in the first Delaunay triangle, and are two-dimensional rectangular coordinates, the image alignment vectors V1, V2, and V3 are respectively image alignment vectors of the pixels P1, P2, and P3, and Pi·Pj indicates a dot product of coordinates Pi and Pj.

6. The method according to claim 4, wherein the calculating an image alignment vector of each pixel in the second image based on the Delaunay triangle comprises:
    using a formula $$V = \sum_{i=1}^{3} W_i * V_i$$

to indicate an image alignment vector V of a pixel P in a polygon formed by an extension line of an outermost second Delaunay triangle of the multiple Delaunay triangles and a boundary of the second image, wherein $$(W_1 \ W_2 \ W_3)^T = \begin{pmatrix} P_1 \cdot P_1 & P_1 \cdot P_2 & P_1 \cdot P_3 \\ P_1 \cdot P_2 & P_2 \cdot P_2 & P_2 \cdot P_3 \\ P_1 \cdot P_3 & P_2 \cdot P_3 & P_3 \cdot P_3 \end{pmatrix}^{-1} \cdot \begin{pmatrix} P_1 \cdot P \\ P_2 \cdot P \\ P_3 \cdot P \end{pmatrix},$$

the pixels P1, P2, and P3 are respectively vertex coordinates in the second Delaunay triangle, and are two-dimensional rectangular coordinates, the image alignment vectors V1, V2, and V3 are respectively image alignment vectors of the pixels P1, P2, and P3, and Pi·Pj indicates a dot product of coordinates Pi and Pj.

7. A dual camera system, comprising: a processor, a memory, and a camera, wherein the camera comprises a first camera and a second camera; and the processor is configured to execute programs stored in the memory, and is specifically configured to:

obtain a first set comprising key point descriptors in a first image that is of a to-be-shot scene and that is formed by using a first camera in a dual camera system, and a second set comprising key point descriptors in a second image that is of the to-be-shot scene and that is formed by using a second camera in the dual camera system, wherein the first image and the second image are formed at a same moment;

pair, based on a similarity of the key point descriptors, a key point in the first set and a key point in the second set that match each other to form a key point pair, wherein paired key points in the first set are in a one-to-one correspondence with paired key points in the second set, and each key point pair comprises one key point in the first set and a matched key point in the second set;

select, according to depth information of the first image and the second image, the key point pair that meets a predetermined condition, wherein the depth information of the first image and the second image is used to describe a depth of a pixel in the first image and the second image at a spatial location corresponding to the to-be-shot scene;

generate an image alignment vector field according to the selected key point pair, wherein the image alignment vector field is a vector field that is formed by an image alignment vector of a pixel in the first image relative to a corresponding pixel in the second image, and an image alignment vector of a first pixel in the first image relative to a second pixel in the second image is a vector obtained by subtracting coordinates of the first pixel from coordinates of the second pixel; and estimate an occlusion area in the first image and the second image according to the depth information of the first image and the second image, and eliminate an alignment vector of the occlusion area in the image alignment vector field, to form a corrected image alignment vector field, wherein an image in the occlusion area of the first image is invisible in the second image, and an image in the occlusion area of the second image is invisible in the first image.

8. The system according to claim 7, wherein:
the depth information of the first image and the second image comprises information about a first-type area and a second-type area of the first image, and information about a first-type area and a second-type area of the second image, the first-type area is an area in which the depth of the pixel is greater than or equal to a predetermined threshold, and the second-type area is an area in which the depth of the pixel is less than the predetermined threshold; and the predetermined condition is: the key point pair is selected if a key point that belongs to the first image in the key point pair is located in the first-type area of the first image, and a key point that belongs to the second image is located in the first-type area of the second image, or a key point that belongs to the first image in the key point pair is located in the second-type area of the first image, and a key point that belongs to the second image is located in the second-type area of the second image.

9. The system according to claim 8, wherein in a process of estimating an occlusion area in the first image and the second image according to the depth information of the first image and the second image, the processor is further configured to:

determine an area that the first-type area of the first image overlaps the second-type area of the second image as the occlusion area, and/or determine an area that the second-type area of the second image overlaps the first-type area of the first image as the occlusion area.

10. The system according to claim 7, wherein the processor is further configured to:

construct multiple Delaunay triangles according to key points that belong to the second image in selected key point pairs;

determine an image alignment vector of each vertex of the multiple Delaunay triangles according to coordinates of the key point of the first image and coordinates of the key point of the second image in the selected key point pair; and calculate an image alignment vector of each pixel in the second image based on the image alignment vector of each vertex of the multiple Delaunay triangles, to form the image alignment vector field.

11. The system according to claim 10, wherein:
in a process of calculating an image alignment vector of each pixel in the second image based on the image alignment vector of each vertex of the multiple Delaunay triangles, to form the image alignment vector field, the processor is further configured to:

obtain an image alignment vector V of a pixel P in a first Delaunay triangle of the multiple Delaunay triangles by using a formula $$V = \sum_{i=1}^{3} W_i * V_i,$$

wherein $$(W_1 \ W_2 \ W_3)^T = \begin{pmatrix} P_1 \cdot P_1 & P_1 \cdot P_2 & P_1 \cdot P_3 \\ P_1 \cdot P_2 & P_2 \cdot P_2 & P_2 \cdot P_3 \\ P_1 \cdot P_3 & P_2 \cdot P_3 & P_3 \cdot P_3 \end{pmatrix}^{-1} \cdot \begin{pmatrix} P_1 \cdot P \\ P_2 \cdot P \\ P_3 \cdot P \end{pmatrix},$$

the pixels P1, P2, and P3 are respectively vertex coordinates in the first Delaunay triangle, and are two-dimensional rectangular coordinates, the image alignment vectors V1, V2, and V3 are respectively image alignment vectors of the pixels P1, P2, and P3, and Pi·Pj indicates a dot product of coordinates Pi and Pj.

12. The system according to claim 10, wherein:

in a process of calculating an image alignment vector of each pixel in the second image based on the image alignment vector of each vertex of the multiple Delaunay triangles, to form the image alignment vector field, the processor is further configured to:

obtain, by using a formula $$V = \sum_{i=1}^{3} W_i * V_i,$$

an image alignment vector V of a pixel P in a polygon formed by an extension line of an outermost second Delaunay triangle of the multiple Delaunay triangles and a boundary of the second image, wherein $$(W_1 \ W_2 \ W_3)^T = \begin{pmatrix} P_1 \cdot P_1 & P_1 \cdot P_2 & P_1 \cdot P_3 \\ P_1 \cdot P_2 & P_2 \cdot P_2 & P_2 \cdot P_3 \\ P_1 \cdot P_3 & P_2 \cdot P_3 & P_3 \cdot P_3 \end{pmatrix}^{-1} \cdot \begin{pmatrix} P_1 \cdot P \\ P_2 \cdot P \\ P_3 \cdot P \end{pmatrix},$$

the pixels P1, P2, and P3 are respectively vertex coordinates in the second Delaunay triangle, and are two-dimensional rectangular coordinates, the image alignment vectors V1, V2, and V3 are respectively image alignment vectors of the pixels P1, P2, and P3, and Pi·Pj indicates a dot product of coordinates Pi and Pj.

\* \* \* \* \*